United States Patent
Nakashima

(10) Patent No.: US 11,953,898 B2
(45) Date of Patent: Apr. 9, 2024

(54) VEHICLE REMOTE OPERATION SYSTEM

(71) Applicant: DENSO CORPORATION, Kariya (JP)

(72) Inventor: Kazuhiro Nakashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 793 days.

(21) Appl. No.: 17/067,937

(22) Filed: Oct. 12, 2020

(65) Prior Publication Data

US 2021/0026347 A1 Jan. 28, 2021

Related U.S. Application Data

(63) Continuation of application No. PCT/JP2019/006002, filed on Feb. 19, 2019.

(30) Foreign Application Priority Data

Apr. 16, 2018 (JP) .................. 2018-078431

(51) Int. Cl.
| | | |
|---|---|---|
| *G05D 1/00* | (2006.01) | |
| *B60W 30/06* | (2006.01) | |
| *G05D 1/02* | (2020.01) | |
| *H04W 4/021* | (2018.01) | |
| *H04W 4/029* | (2018.01) | |
| *H04W 4/40* | (2018.01) | |

(52) U.S. Cl.
CPC ......... *G05D 1/0022* (2013.01); *G05D 1/0038* (2013.01); *G05D 1/0212* (2013.01); *H04W 4/021* (2013.01); *H04W 4/029* (2018.02); *H04W 4/40* (2018.02); *B60W 30/06* (2013.01)

(58) Field of Classification Search
CPC .. G05D 1/0022; G05D 1/0038; G05D 1/0212; H04W 4/029; H04W 4/40; H04W 4/021; B60W 30/06
See application file for complete search history.

(56) References Cited

U.S. PATENT DOCUMENTS

2019/0202443 A1* 7/2019 Lavoie .................. B60W 30/06

FOREIGN PATENT DOCUMENTS

| JP | 2008027390 A | 2/2008 |
|---|---|---|
| JP | 2010138623 A | 6/2010 |
| JP | 2010275701 A | 12/2010 |
| JP | 5102192 B2 | 12/2012 |
| JP | 2015089733 A | 5/2015 |
| JP | 2015193987 A | 11/2015 |
| KR | 20170025206 A | 3/2017 |

* cited by examiner

*Primary Examiner* — Michael D Lang
(74) *Attorney, Agent, or Firm* — Harness, Dickey & Pierce, P.L.C.

(57) ABSTRACT

A vehicle remote operation system includes: a communication device that performs wireless communication with a mobile device; a position determination portion that determines whether the mobile device exists in an activation area; a remote operation acceptance portion that accepts a remote operation as a user instruction operation to move the vehicle; a control execution portion that performs control corresponding to a content of the remote operation; and a notification processor that notifies a user that a position of the mobile device changes from an inside of the activation area to an outside of the activation area.

11 Claims, 11 Drawing Sheets

VEHICLE REMOTE OPERATION SYSTEM

CROSS REFERENCE TO RELATED APPLICATIONS

The present application is a continuation application of International Patent Application No. PCT/JP2019/006002 filed on Feb. 19, 2019, which designated the U.S. and claims the benefit of priority from Japanese Patent Application No. 2018-078431 filed on Apr. 16, 2018. The entire disclosures of all of the above applications are incorporated herein by reference.

TECHNICAL FIELD

The present disclosure relates to a vehicle remote operation system that moves a vehicle based on remote operations allowing a user to use a mobile device.

BACKGROUND

In a comparative example, a vehicle remote operation system performs remote operations allowing a user to use a mobile device. The vehicle remote operation system concerning the vehicle movement enables remote operations using a mobile device only when a user carrying the mobile device exists within a given activation area dependent on the vehicle as a reference. The activation area is defined as an area within a predetermined distance (for example, three meters) from the vehicle. Varieties of methods determine whether the user (substantially the mobile device) exists in the activation area based on wireless communication between the vehicle and the mobile device.

SUMMARY

A vehicle remote operation system includes: a communication device that may perform wireless communication with a mobile device; a position determination portion that may determine whether the mobile device exists in an activation area; a remote operation acceptance portion that may accept a remote operation as a user instruction operation to move the vehicle; a control execution portion that may performs control corresponding to a content of the remote operation; and a notification processor that may notify a user that a position of the mobile device changes from an inside of the activation area to an outside of the activation area.

BRIEF DESCRIPTION OF DRAWINGS

The above and other features and advantages of the present disclosure will be more clearly understood from the following detailed description with reference to the accompanying drawings. In the drawings.

DETAILED DESCRIPTION

Figure 1:
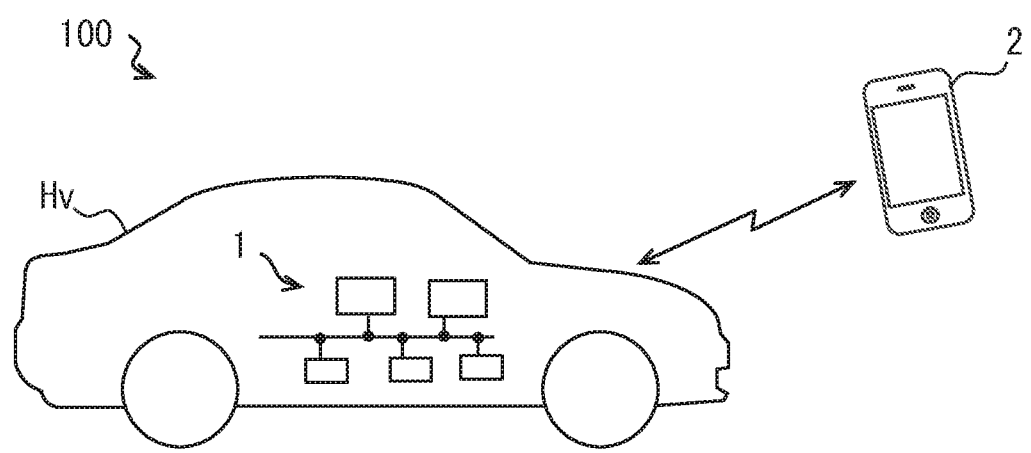
FIG. 1 is a diagram illustrating a schematic configuration of a vehicle remote operation system.

The vehicle stops traveling when the user departs from the activation area dependent on the vehicle as a reference. Namely, the remote control stops when the user leaves the vehicle as long as the predetermined distance or more. For example, when the user needs to smoothly park the vehicle based on the remote operation, the user needs to move along with the vehicle until completion of the parking and continue staying in the activation area for the vehicle.

Since the activation area is invisible, the user can hardly recognize the boundary of the activation area. When the user exists near the boundary of the activation area, the user may be changeably determined to exist inside or outside the activation area. Namely, the state change is repeated. If the result of determining the user position changes several times, the remote control over the vehicle is interrupted each time the user is determined to exist outside the activation area. As a result, the user-friendliness is degraded.

One example of the present disclosure provides a vehicle remote operation system capable of improving the user-friendliness.

According to one example embodiment, a vehicle remote operation system performs control to move a vehicle based on wireless communication with a mobile device carried by a user of the vehicle. The vehicle remote operation system includes: a communication device that performs the wireless communication with the mobile device; a position determination portion that determines whether the mobile device exists in an activation area predetermined for the vehicle, based on a communication situation between the communication device and the mobile device; a remote operation acceptance portion that accepts a remote operation as a user instruction operation to move the vehicle via the mobile device based on a result that the position determination portion determines that the mobile device exists in the activation area; a control execution portion that performs control corresponding to a content of the remote operation accepted by the remote operation acceptance portion; and a notification processor that notifies the user that a position of the mobile device changes from an inside of the activation area to an outside of the activation area via the mobile device or an instrument mounted on the vehicle. The remote operation acceptance portion accepts the remote operation while a predetermined acceptance continuation condition is satisfied even when the position of the mobile device changes from the inside of the activation area to the outside of the activation area.

According to one example embodiment, the state of validating the remote operation is maintained while a predetermined acceptance continuation condition is satisfied even when the mobile device leaves the activation area. Namely, the departure of the mobile device from the activation area does not immediately cause a state (interrupted state) that interrupts the remote control.

The notification processor notifies the user that the mobile device leaves the activation area. The user can return to inside the activation area until the transition to a state interrupting the remote control after the mobile device leaves the activation area.

According to the present disclosure, it may be possible to reduce the risks of repeatedly interrupting and restarting the remote control over the vehicle even when the user changeably stays inside or outside the activation area.

The description below explains the first embodiment of the present disclosure with reference to the accompanying drawings. FIG. 1 is a diagram illustrating a schematic configuration of a vehicle remote operation system 100. As illustrated in FIG. 1, the vehicle remote operation system 100 includes an in-vehicle system 1 mounted on a vehicle Hv and a mobile device 2 carried by a user of the vehicle Hv. The mobile device 2 is associated with the in-vehicle system 1 and functions as a key (substantially, an electronic key) for the vehicle Hv. The in-vehicle system 1 and the mobile device 2 perform wireless communication (BLE communication) compliant with the standard of Bluetooth Low Energy (BLE), where Bluetooth is a registered trademark.

The in-vehicle system 1 and the mobile device 2 are capable of providing wireless communication according to systems compliant with communication standards different from BLE. Specifically, the in-vehicle system 1 includes: a function to transmit wireless signals at a predetermined frequency (first vehicular frequency) to the inside of a vehicle compartment and a predetermined range of the vehicle circumference; and a function to receive wireless signals at a predetermined frequency (second vehicular frequency) transmitted from the mobile device 2. The mobile device 2 includes: a function to receive signals at the first vehicular frequency; and a function to transmit signals at the second vehicular frequency to the in-vehicle system 1.

The first vehicular frequency corresponds to a predetermined frequency belonging to an LF (Low Frequency) band such as 125 kHz or 134 kHz, for example. The LF band denotes a frequency band lower than or equal to 300 kHz. The first vehicular frequency may cover frequencies ranging from 20 to 30 kHz. The second vehicular frequency belongs to a UHF (Ultra High Frequency) such as 315 MHz or 920 MHz, for example. The UHF band ranges from 300 MHz to 3 GHz.

The first vehicular frequency preferably uses a frequency 200 kHz or lower from the viewpoint of forming a response area to be described. The second vehicular frequency is preferably set to frequencies other than 2.4 GHz used for the BLE communication to avoid congestion with the BLE communication. For example, the first vehicular frequency is herein set to 125 kHz. The second vehicular frequency is herein set to 315 MHz. In the technological field of vehicular electronic key systems, a wireless signal transmitted from the mobile device 2 through the use of the second vehicular frequency is also referred to as an RF (Radio Frequency) signal.

The in-vehicle system 1 authenticates the mobile device 2 by wirelessly communicating with the mobile device 2 through the use of radio waves at the first vehicular frequency and the second vehicular frequency. The in-vehicle system 1 performs the predetermined vehicle control for the user to use the vehicle Hv based on the successful authentication of the mobile device 2. The vehicle control for the user to use the vehicle Hv mainly includes locking or unlocking vehicle doors and starting an engine.

The process of the in-vehicle system 1 to authenticate the mobile device 2 confirms that a communication terminal (communication target) wirelessly communicating with the in-vehicle system 1 corresponds to the legitimate mobile device 2 associated with the in-vehicle system 1. The successful authentication signifies that the communication terminal is determined to be the legitimate mobile device 2.

The in-vehicle system 1 may authenticate the mobile device 2 based on the challenge-response authentication. An authentication process will be described in detail later. As a preparation for the authentication process, the mobile device 2 and the in-vehicle system 1 each save a common encryption key used for the authentication process. The mobile device 2 is assigned a unique identification number (mobile device ID). The in-vehicle system 1 registers the mobile device ID. The encryption key may use the mobile device ID. The in-vehicle system 1 is also assigned a unique identification number (vehicle ID). The mobile device 2 registers the vehicle ID.

(Configuration of the Mobile Device 2)

The configuration of the mobile device 2 will be described. The mobile device 2 may represent a dedicated communication terminal for the user to remotely operate the vehicle Hv or a general-purpose information processing terminal such as a smartphone or a tablet terminal. The mobile device 2 can be embodied through the use of a communication terminal used for various purposes.

Figure 2:
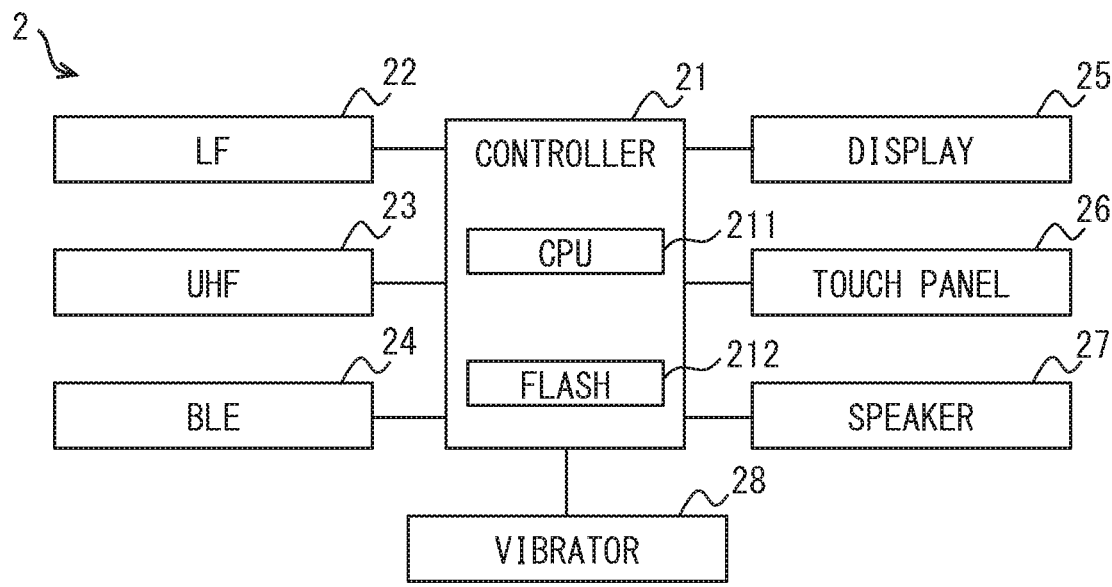
FIG. 2 is a block diagram schematically illustrating an electric configuration of a mobile device.

As illustrated in FIG. 2, the mobile device 2 includes a controller 21, an LF receiver 22, an RF communication device 23, a BLE communication device 24, a display 25, a touch panel 26, a speaker 27, and a vibrator 28. The controller 21 is communicably connected with each of the LF receiver 22, the RF communication device 23, the BLE communication device 24, the display 25, the touch panel 26, the speaker 27, and the vibrator 28.

The controller 21 controls overall operations of the mobile device 2. The controller 21 is mainly configured as a computer. The controller 21 is embodied through the use of a CPU 211, flash memory 212, RAM, I/O (not shown), and an clock oscillator (not shown), for example. The controller 21 may be embodied through the use of GPU, MPU, or IC instead of the CPU 211. Besides, the controller 21 may be embodied with a combination of CPU, GPU, MPU, and IC.

The flash memory 212 stores an application program (mobile device program) that allows the computer to function as the controller 21. The flash memory 212 also stores device IDs and data supplied to the authentication process for the in-vehicle system 1 as well as the program. The data supplied to the authentication process for the in-vehicle system 1 includes an encryption key used to generate a response code from a challenge code, for example. The mobile device program may be provided as an application program that is provided from the outside by means of download, for example, and is installed in the mobile device 2. The flash memory exemplifies a non-transitory tangible storage medium.

The controller 21 provides various functions to be described by allowing the CPU 211 to execute the mobile device program stored in the flash memory 212. The controller 21 will be described in detail later.

The LF receiver 22 receives a wireless signal (LF signal) that is transmitted from the in-vehicle system 1 and uses the first vehicular frequency. The LF receiver 22 is embodied through the use of an antenna to receive the LF signal and a circuit (demodulation circuit) to demodulate a reception signal. The LF receiver 22 applies predetermined processes such as analog-digital conversion, demodulation, and decryption to a signal received through the antenna and thereby extracts data contained in the reception signal. The extracted data is supplied to the controller 21.

The RF communication device 23 is configured so that the mobile device 2 can transmit a wireless signal (RF signal) at the second vehicular frequency to the in-vehicle system 1. The RF communication device 23 converts a baseband signal input from the controller 21 into a radio wave at the second vehicular frequency (here, 315 MHz) and radiates the radio wave into the air. The RF communication device 23 mainly includes an antenna and a modulation circuit. The RF communication device 23 is also referred to as a UHF communication device.

As one aspect of the present embodiment, the RF communication device 23 includes only a transmission function. As another aspect, the RF communication device 23 may include the transmission function and a reception function when the in-vehicle system 1 is capable of transmitting the RF signal. The demodulation circuit or an amplifier provides the reception function.

The BLE communication device 24 provides a communication module to perform the BLE communication. The BLE communication device 24 is capable of wireless communication with other devices (for example, the in-vehicle system 1) available within a range of 10 meters. For example, the BLE communication device 24 receives a signal that is transmitted from the in-vehicle system 1 and is compliant with the Bluetooth standard. The BLE communication device 24 supplies the received signal to the controller 21. The BLE communication device 24 modulates data input from the controller 21 and transmits the data to the in-vehicle system 1. The following description denotes a signal transmitted and received through the BLE communication also as a BLE signal to make a distinction from an LF signal transmitted from an LF transmitter 13 and an RF signal received by an RF communication device 14. The BLE signal is comparable to a wireless signal compliant with the Bluetooth standard.

The BLE communication device 24 included in the mobile device 2 wirelessly transmits a communication packet containing transmitter information (for example, the device ID) at a predetermined transmission interval and thereby notifies (advertises) its existence to a nearby communication terminal having the BLE communication function. In the following description, an advertising packet denotes a communication packet that is periodically transmitted for advertisement.

The display 25 represents a device that displays video signal (in other words, image data) input from the controller 21. The display 25 is available as varieties of display devices such as a liquid crystal display and an organic EL display.

The touch panel 26 represents an input device for the user to operate the mobile device 2 and is placed to overlap with the display 25. The touch panel 26 detects a position touched by the user and successively outputs a touched position signal indicating the position as a operation signal to the controller 21. The mobile device 2 may include a mechanical button as an input device. The speaker 27 represents a device that converts an electric signal supplied from the controller 21 into sound and outputs the sound. The speaker 27 outputs a predetermined alarm sound or audible message based on an input signal from the controller 21, for example. The vibrator 28 represents a device that generates the vibration. The vibrator 28 vibrates according to a predetermined vibration pattern based on an input signal from the controller 21, for example.

(Functions of the Mobile Device 2)

Figure 3:
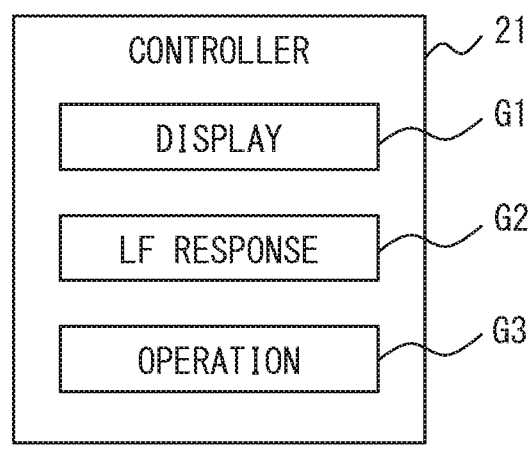
FIG. 3 is a function block diagram schematically illustrating a controller.

The mobile device 2 provides functions as a display controller G1, an LF response portion G2, and a remote operation processor G3 as illustrated in FIG. 3 by allowing the CPU 211 to execute the mobile device program. Hardware may embody all or part of the functions provided by the controller 21. Aspects to use the hardware include an aspect to use an analog circuit element and an aspect to use one or more ICs.

The display controller G1 controls display screens on the display 25 based on the user's operation on the touch panel 26 or instructions from the in-vehicle system 1. The display controller G1 displays various types of screens including a menu screen, a remote operation screen, or the like. The menu screen enables the user to select an intended function from multiple functions provided for the mobile device 2. The menu screen is comparable to a screen displaying a list of functions (substantially applications) available for the user. The remote operation screen enables the user to use a function to travel the vehicle Hv according to the remote operation by using the mobile device 2.

Figure 4:
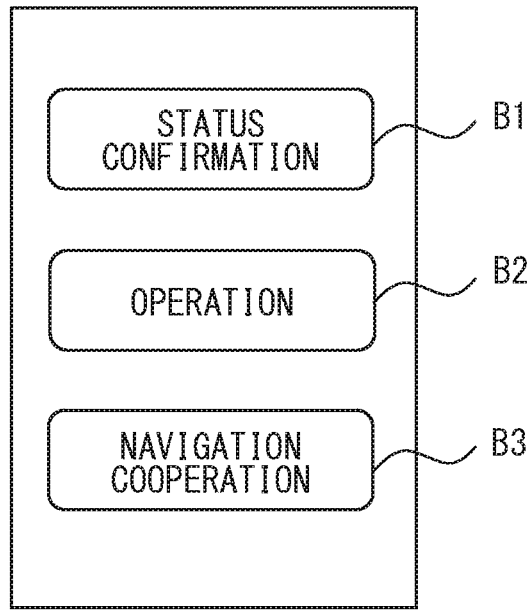
FIG. 4 illustrates a display screen (menu screen) on a display of the mobile device.

As illustrated in FIG. 4, the menu screen includes a status confirmation button B1, a remote operation function button B2, and a navigation-cooperative button B3, for example. The status confirmation button B1 displays a screen that indicates the current state of the vehicle Hv such as, for example, the residual fuel or the temperature in the vehicle compartment. Data indicating the state of the vehicle Hv can be acquired from the BLE communication with the in-vehicle system 1, for example. The remote operation function button B2 enables the user to use the remote operation function. When the user presses the remote operation function button B2, the display controller G1 displays the remote operation screen, for example. The navigation-cooperative button B3 allows the mobile device 2 to cooperate with a navigation system installed in the vehicle Hv.

The LF response portion G2 performs a process that generates and returns a response signal in response to an LF signal transmitted from the in-vehicle system 1 in cooperation with the LF receiver 22 and the RF communication device 23. When the LF receiver 22 receives the LF signal, the LF response portion G2 generates a baseband signal as a response signal in response to the received signal and outputs the baseband signal to the RF communication device 23. When the LF receiver 22 receives a challenge signal from the in-vehicle system 1, for example, the LF response portion G2 generates a response signal containing a response code generated through the use of an encryption key previously stored in the flash memory 212. The LF response portion G2 outputs the response signal to the RF communication device 23 to output the response signal as an RF signal.

The types of signals generated by the LF response portion G2 are not limited to the above. When the LF receiver 22 receives an LF polling signal (to be described) transmitted from the in-vehicle system 1, the controller 21 as the LF response portion G2 generates a predetermined response signal and transmits the response signal in cooperation with the RF communication device 23.

The remote operation processor G3 performs a process enabling the user to remotely control the vehicle Hv by using the mobile device 2. The remote operation processor G3 performs a process allowing the mobile device 2 to function as a device (remote controller) that remotely controls operations of the in-vehicle system 1. The remote operation processor G3 just needs to operate when the communication connection is established between the mobile device 2 and the in-vehicle system 1. The state of establishing the communication connection between the mobile device 2 and the in-vehicle system 1 signifies that the mobile device 2 performs BLE communication with the in-vehicle system 1, for example.

The remote operation processor G3 displays the remote operation screen on the display 25 in cooperation with the display controller G1. Based on user operations on the remote operation screen, the remote operation processor G3 specifies an instruction content (for example, moving forward or backward) concerning the travel of the vehicle Hv. The remote operation processor G3 transmits a BLE signal indicating the contents of the user-specified vehicle control to the in-vehicle system 1.

Figure 5:
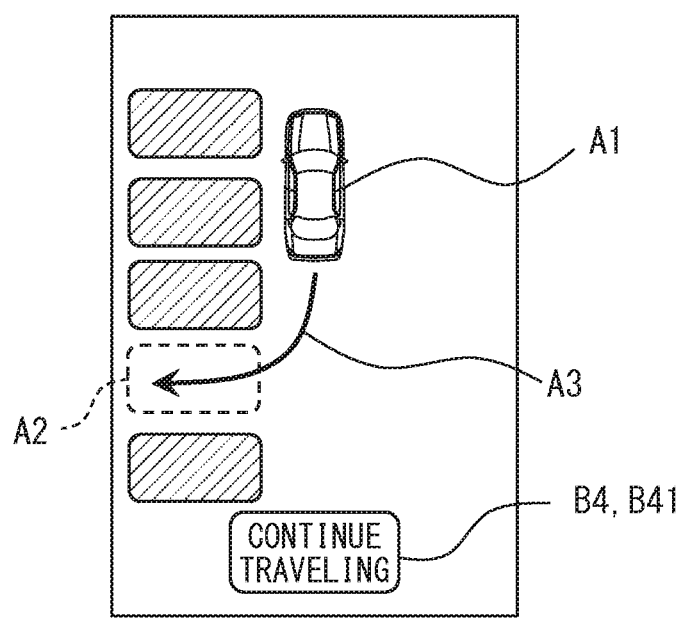
FIG. 5 is a diagram illustrating one example of a remote operation screen.

For example, the remote operation processor G3 allows the display 25 to display, as one example, a remote operation screen such as a screen (remote parking screen) to perform operations that allow the vehicle Hv to travel to a predetermined parking position. As illustrated in FIG. 5, for example, the remote parking screen includes a button (parking instruction button) B41 that instructs the user to allow the vehicle Hv to automatically travel to a predetermined parking position. The remote parking screen also includes image A1 indicating the current position of the vehicle Hv, image A2 indicating a targeted parking position, and image A3 indicating a travel route.

It is supposed that the remote parking screen is used for a user operation (parking instruction operation) that instructs the vehicle Hv to automatically travel to the predetermined parking position. Then, the remote operation processor G3 successively transmits a command signal (parking instruction signal) corresponding to the operation to the in-vehicle system 1. The parking instruction signal may be transmitted in cooperation with the BLE communication device 24. The parking instruction signal may also be transmitted in cooperation with the RF communication device 23.

The user operation that instructs the vehicle Hv to automatically travel to a predetermined parking position signifies pressing (substantially, touching) the parking instruction button B41, for example. The in-vehicle system 1 allows the vehicle to travel only when the parking instruction operation continues or the user keeps touching the parking instruction button B41. The in-vehicle system 1 stops the vehicle when the parking instruction operation is interrupted, for example, the user releases the finger from the parking instruction button B41. A remote parking function represents a function of enabling the user to park the vehicle Hv based on remote operations using the mobile device 2.

Figure 6:
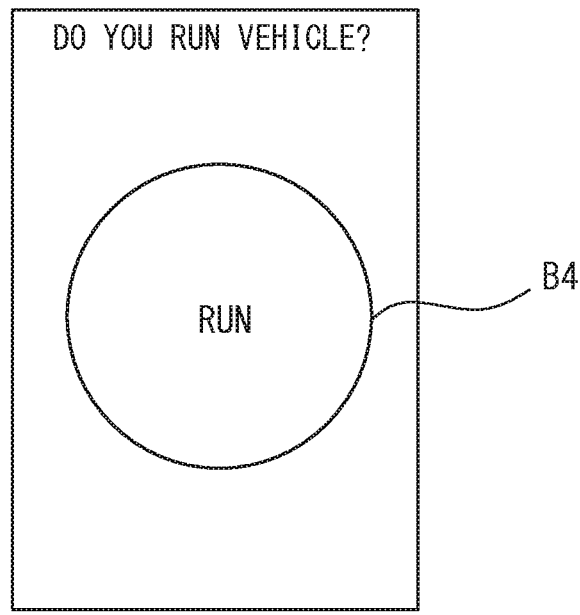
FIG. 6 is a diagram illustrating one example of the remote operation screen.

The parking instruction operation may be defined otherwise such as continuously running a finger on a circle displayed on the screen. The specific contents of the parking instruction operation may be designed appropriately. Regulations of districts where the vehicle Hv is used may be taken into consideration to determine whether the parking instruction operation requires continuously pressing a predetermined button or requires continuously performing a predetermined operation. The remote parking screen need not include image A1 indicating the current position of the vehicle Hv, for example. As illustrated in FIG. 6, for example, the remote parking screen may include only parking instruction button B4.

Figure 7:
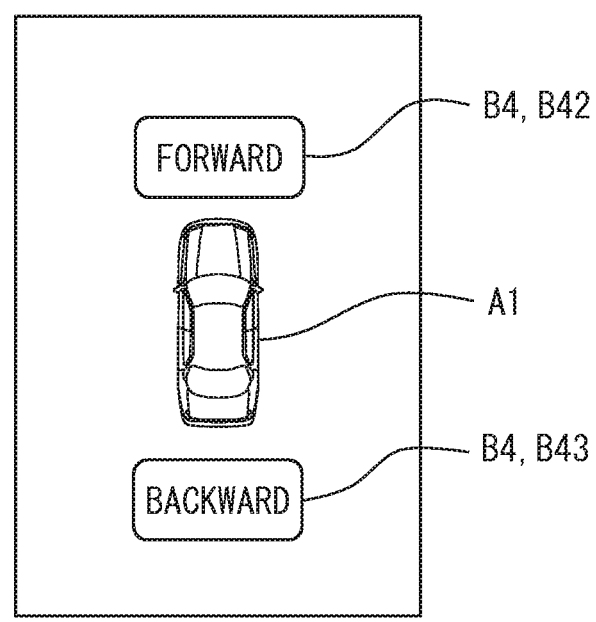
FIG. 7 is a diagram illustrating one example of the remote operation screen.

The function of allowing the vehicle Hv to travel based on remote operations is applied not only to a parking scene. The in-vehicle system 1 may be capable of providing control to unload the parked vehicle Hv to a predetermined target position based on remote operations. Moreover, the in-vehicle system 1 is not limited to scenes such as parking and unloading but may allow the vehicle Hv to travel in user-specified directions. As illustrated in FIG. 7, for example, the remote operation processor G3 displays the remote operation screen that includes a forward instruction button B42 to instruct the vehicle Hv to move forward and a backward instruction button B43 to instruct the vehicle Hv to move backward. The in-vehicle system 1 may specify the contents of user instructions (for example, moving forward and backward) on the travel of the vehicle Hv based on user operations on the buttons. Hereinafter, a remote operation button B4 represents screen elements (for example, icons) to instruct the travel of the vehicle Hv such as the parking instruction button B41, the forward instruction button B42, and the backward instruction button B43.

(Configuration of the In-Vehicle System 1)

The configuration of the in-vehicle system 1 will be described. The in-vehicle system 1 wirelessly communicates with the mobile device 2 to provide a smart function and a remote operation function. The smart function locks or unlocks doors of the vehicle Hv and starts an engine based on user operations such as pressing a predetermined button or touching a predetermined touch sensor provided for the vehicle Hv. Using the smart function, the user can control the vehicle without operating the mobile device 2. The remote operation function enables the user to remotely control the vehicle Hv by using the mobile device 2.

Figure 8:
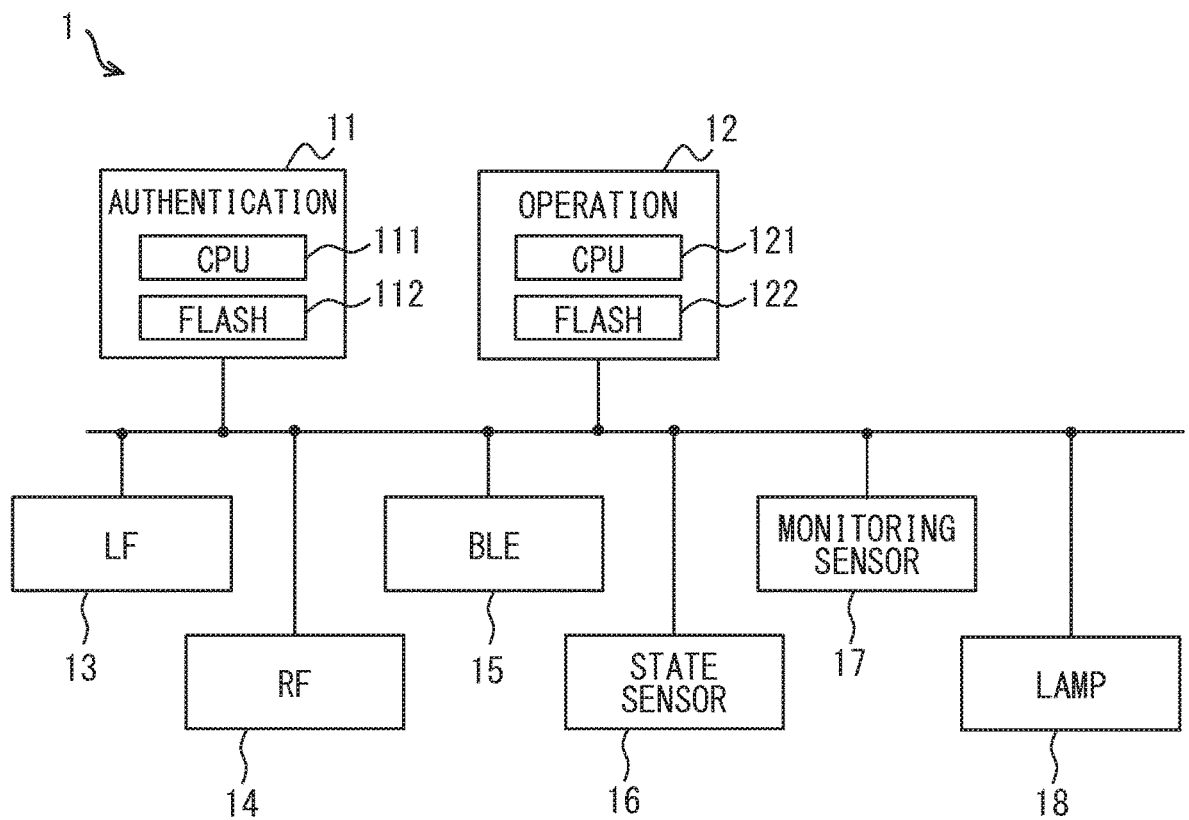
FIG. 8 is a block diagram schematically illustrating a configuration of an in-vehicle system.

As illustrated in FIG. 8, the in-vehicle system 1 includes an authentication ECU 11, a remote operation ECU 12, the LF transmitter 13, the RF communication device 14, a BLE communication device 15, a vehicle state sensor 16, a circumference surveillance sensor 17, and a communication lamp 18. The ECU in the member names stands for an electronic control unit. Various configurations are communicably connected to each other via a communication network built in the vehicle.

The authentication ECU 11 performs authentication based on the wireless communication with the mobile device 2. The authentication ECU 11 is configured as a computer mainly including a CPU 111, flash memory 112, RAM, an I/O, and a bus line connecting these. The authentication ECU 11 may be embodied through the use of GPU or MPU instead of the CPU 111. The authentication ECU 11 may be embodied with a combination of the CPU 111, GPU, and MPU.

The flash memory 112 is nonvolatile and rewritable. For example, the flash memory 112 stores an application program (authentication program) that allows the computer to function as the authentication ECU 11 or the like. A specific medium to store the authentication program is available as a variety of non-transitory tangible storage medium. Execution of the authentication program on the CPU 111 is comparable to the execution of a method corresponding to the authentication program. The later part of the description explains in detail functions provided by the authentication ECU 11 that is embodied by executing the authentication program on the CPU 111.

The remote operation ECU 12 executes vehicle control corresponding to the operation (that is, remote operation) based on an instruction issued to the vehicle Hv by the user from the mobile device 2. The remote operation ECU 12 controls acceleration, deceleration, or steering of the subject vehicle based on the user's remote operations using the mobile device 2. The remote operation ECU 12 enables automatic traveling of the vehicle Hv in cooperation with a steering ECU for steering control or an engine ECU or a brake ECU for acceleration or deceleration control.

The remote operation ECU 12 is configured as a computer mainly including a CPU 121, flash memory 122, RAM, an I/O, and a bus line connecting these. The remote operation ECU 12 may be embodied through the use of GPU or MPU instead of the CPU 121. The remote operation ECU 12 may be embodied with a combination of the CPU 121, GPU, and MPU.

The flash memory 122 is nonvolatile and rewritable. For example, the flash memory 122 stores a program (remote operation program) that allows the computer to function as the remote operation ECU 12. A specific medium to store the remote operation program is available as a variety of non-transitory tangible storage medium. Execution of the remote operation program on the CPU 121 is comparable to the execution of a method corresponding to the remote operation program. The later part of the description explains in detail functions provided by the remote operation ECU 12 that is embodied by executing the remote operation program on the CPU 121.

The LF transmitter 13 converts a baseband signal input from the authentication ECU 11 and the remote operation ECU 12 into a radio wave at the predetermined first vehicular frequency (here, 125 kHz) and radiates the radio wave into the air. The LF transmitter 13 mainly includes an antenna and a modulation circuit. The multiple LF transmitters 13 are provided for the in-vehicle system 1 as a whole to form a response area inside the vehicle compartment and in the vehicle circumference. The response area is comparable to a range in which the mobile device 2 returns a UHF-band response signal in response to a signal (LF signal) at the first vehicular frequency transmitted from the in-vehicle system 1. For example, the response area is comparable to a range that enables an LF signal transmitted from the in-vehicle system 1 to propagate while maintaining a predetermined signal strength.

For example, the signal strength of an LF signal defining inner and outer boundary lines of the response area can be assumed to be a lower limit (demodulation limit value) of the signal level that enables the mobile device 2 to demodulate received signals. Alternatively, the signal strength of an LF signal defining inner and outer boundary lines of the response area can be assumed to be a predetermined value (response threshold value) larger than the demodulation limit value. A designer can appropriately set the response threshold value to form an intended response area. In such an aspect, when the mobile device 2 receives a signal with the reception strength capable of demodulation from the in-vehicle system 1 but the reception strength is lower than or equal to the response threshold value, the mobile device 2 determines the in-vehicle system 1 to exist outside the response area and returns no response.

The response area for the in-vehicle system 1 as a whole corresponds to a range resulting from combining (integrating) response areas formed by the LF transmitters 13. It may be preferable to appropriately design the size or the shape of each response area formed by the LF transmitter 13. The size or the shape of each response area formed by the LF transmitter 13 is adjustable based on the response threshold value, the electric power to transmit an LF signal from the vehicle Hv, or the receiving sensitivity of the mobile device 2. The vehicle circumference corresponds to an area within three meters from the vehicle, for example. The in-vehicle system 1 may provide the response area within six meters from the vehicle Hv. The LF transmitter 13 is comparable to a first communication device.

The RF communication device 14 receives a wireless signal (RF signal) that is transmitted from the mobile device 2 at the second vehicular frequency. The RF communication device 14 is embodied through the use of an antenna to receive RF signals transmitted from the mobile device 2 and a circuit (demodulation circuit) to demodulate received signals, for example. The RF communication device 14 applies predetermined processes such as analog-digital conversion, demodulation, and decryption to a signal received at the antenna and thereby extracts data contained in the signal. The extracted data is supplied to the authentication ECU 11 and the remote operation ECU 12.

The BLE communication device 15 provides a communication module for BLE communication with the mobile device 2. The BLE communication device 15 receives signals transmitted from the mobile device 2 and supplies received signals to the predetermined ECU (for example, the authentication ECU 11 or the remote operation ECU 12). The BLE communication device 15 modulates data supplied from various ECUs and transmits the data to the mobile device 2.

The BLE communication device 15 is placed on a ceiling in the vehicle compartment, for example. The BLE communication device 15 may be mounted on a B or C pillar. The multiple BLE communication devices 15 may be provided. The BLE communication device 15 is capable of wireless communication with other devices (for example, the mobile device 2) available within the range of 10 meters. A BLE communication area signifies an area where the BLE communication device 15 is capable of BLE communication with the mobile device 2. The BLE communication area is wider than the response area provided by the LF transmitter 13. The BLE communication device 15 is comparable to a second communication device.

The BLE communication device 15 includes a nonvolatile memory (not shown) that stores information (mobile device information) about the mobile device 2. The mobile device information is acquired by the user operation (pairing) that accomplishes the key exchange protocol between the mobile device 2 and the BLE communication device 15. The mobile device information is comparable to a key or a device ID exchanged by the pairing, for example. The state of saving the exchanged key is also referred to as bonding.

The BLE communication device 15 receives an advertising packet from the mobile device 2, thereby detects the existence of the mobile device 2, and notifies the authentication ECU 11 or the remote operation ECU 12 of the existence. When receiving an advertising packet from the mobile device 2, the BLE communication device 15 automatically establishes a communication connection with the mobile device 2 by using the saved mobile device information. When the BLE communication device 15 is paired with the multiple mobile devices 2, the mobile device information about each of the mobile devices 2 is saved.

The vehicle state sensor 16 detects information indicating states of the vehicle Hv. The vehicle state sensor 16 represents a vehicle speed sensor, an acceleration sensor, a yaw rate sensor, a shift position sensor, a steering angle sensor, or the like, for example. The vehicle speed sensor detects travel speeds of the vehicle Hv. The acceleration sensor detects accelerations acting in the front-back direction of the vehicle and the vehicle width direction. The yaw rate sensor detects a yaw rate acting on the vehicle Hv. The shift position sensor detects shift lever positions. The steering angle sensor detects rotation angles of a steering wheel (steering wheel angle) or swivel angles as steering angles.

The sensors successively provide the authentication ECU 11 and the remote operation ECU 12 with data corresponding to current values (that is, detection results) indicating a current value of physical state quantities to be detected. It is preferable to appropriately design the types of sensors as the vehicle state sensor 16 provided for the in-vehicle system 1. All the above-described sensors need not be provided.

The circumference surveillance sensor 17 represents a camera to capture a predetermined range around the vehicle Hv and a sonar or a radar to transmit exploration radio waves to the predetermined range around the vehicle Hv. The in-vehicle system 1 may include multiple types of sensors as the circumference surveillance sensor 17. The in-vehicle system 1 according to the present embodiment includes the circumference surveillance sensor 17 including a forward camera to capture a forward scene of the vehicle, a backward camera to capture a backward scene thereof, and multiple sonars. The sonars are placed at different positions of the vehicle Hv to allocate detection areas to different parts of the vehicle circumference.

The circumference surveillance sensor 17 detects moving objects such as pedestrians and other vehicles and motionless objects such as fallen objects on the road, traffic signals, guardrails, curbstones, road signs, road indications, and separation lines around the vehicle in at least the travel direction. The circumference surveillance sensor 17 successively supplies the remote operation ECU 12 with detected object data indicating relative positions of moving objects and motionless objects as detected objects with reference to the vehicle Hv.

The communication lamp 18 represents a lighting device placed on an outside surface portion of the vehicle Hv. The outside surface portion corresponds to a body part of the vehicle Hv in contact with the space outside the vehicle compartment and includes a side portion, a rear portion, and a front portion of the vehicle Hv. The communication lamp 18 turns on or off based on instructions from the authentication ECU 11 and the remote operation ECU 12. The communication lamp 18 is comparable to in-vehicle equipment that notifies a user of various information.

The communication lamp 18 is placed at a predetermined position near the door, namely, the position where the user standing near the vehicle Hv can visually recognize the communication lamp 18. For example, the communication lamp 18 is provided for a right or left side mirror, a top or bottom end of the side surface, or a door handle. The communication lamp 18 is provided for both of the right side and the left side of the vehicle Hv. The bottom end of the side surface signifies an area that is positioned at the bottom end of the side surface of the vehicle Hv and corresponds to the bottom part of the door. The bottom end of the side surface corresponds to a side sill or a side step, for example. The bottom end of the side surface also includes the right end and the left end of the vehicle bottom.

(Functions of the Authentication ECU 11)

The description below explains the functions provided by the authentication ECU 11. The authentication ECU 11 performs an authentication process for the mobile device 2 in cooperation with the LF transmitter 13 and the RF communication device 14. The authentication process determines that the authentic mobile device 2, as a communication terminal, returns a response to an LF signal transmitted from the in-vehicle system 1. Since a user carries the mobile device 2, the successful authentication of the mobile device 2 determines that the person to use the vehicle Hv is an authentic user. Since the response area for LF signals is limited to the vehicle circumference, the successful authentication of the mobile device 2 determines that the user exists in the vehicle circumference (substantially, within the response area).

The authentication ECU 11 can use various systems to authenticate the mobile device 2. Here, in one example, the authentication ECU 11 uses the challenge-response authentication to perform the authentication process. The authentication ECU 11 transmits an LF signal (challenge signal) containing a challenge code in cooperation with the LF transmitter 13 in response to the occurrence of a predetermined event to perform the authentication process.

The challenge code is used to authenticate the mobile device 2. The challenge code may be used as a random number generated from the use of a random number table or the like. When receiving the challenge code, the mobile device 2 encrypts the challenge code by using an encryption key previously stored in the mobile device 2 and returns an RF signal (response signal) containing the encrypted code (response code).

The authentication ECU 11 transmits a challenge signal and generates a code (verification code) resulting from encrypting the challenge signal by using an encryption key maintained in the authentication ECU 11. The authentication ECU 11 determines that the communication party is the authentic mobile device 2 (successful authentication) when the returned response code matches the verification code. The response signal is comparable to information to authenticate that the mobile device 2 is a key for the vehicle Hv.

It is preferable to appropriately design the timing for the authentication ECU 11 to perform the authentication process. For example, the authentication ECU 11 performs the authentication process at a predetermined authentication cycle when the user presses the remote operation button B4 or the vehicle Hv is parked. The authentication ECU 11 notifies the remote operation ECU 12 of an authentication result. In other words, the authentication ECU 11 and the remote operation ECU 12 share results of the authentication process. As another aspect, the authentication ECU 11 may perform the authentication process of the mobile device 2 through the use of BLE communication.

(Functions of the Remote Operation ECU 12)

Figure 9:
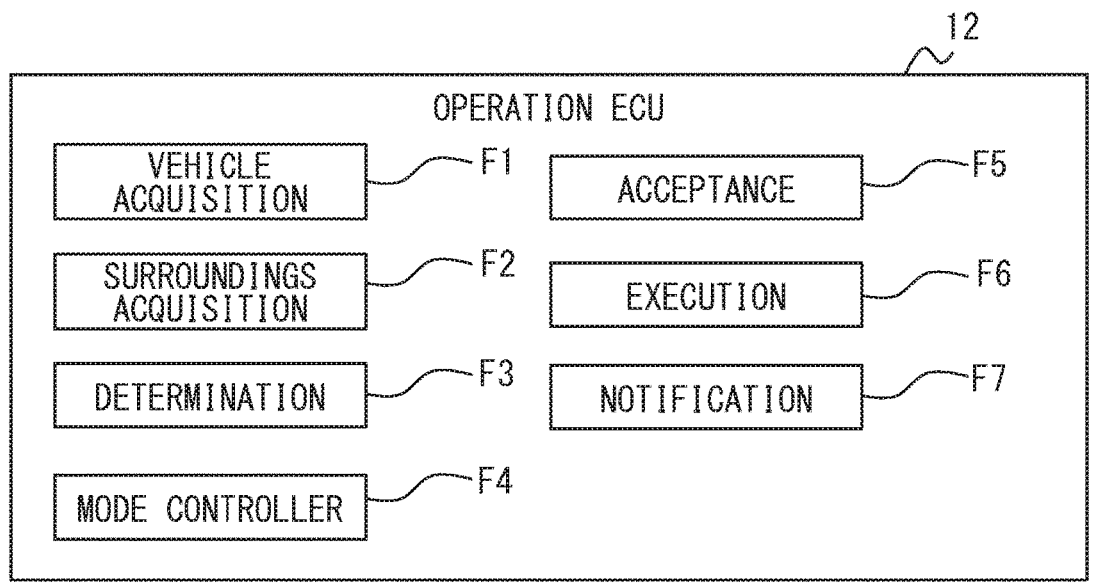
FIG. 9 is a function block diagram illustrating a remote operation ECU.

Functions of the remote operation ECU 12 will be described. As illustrated in FIG. 9, the remote operation ECU 12 includes function blocks such as a vehicle information acquisition portion F1, a surroundings information acquisition portion F2, a position determination portion F3, a mode controller F4, a remote operation acceptance portion F5, a control execution portion F6, and a notification processor F7. The CPU 121 executes a remote operation program to provide functions corresponding to these function blocks. All or part of the functions provided by the remote operation ECU 12 may be embodied as hardware.

The vehicle information acquisition portion F1 acquires various information (vehicle information) indicating states of the vehicle Hv from the vehicle state sensor 16. The vehicle information includes vehicle speeds, accelerations, yaw rates, steering angles, and operation states corresponding to shift lever positions, for example. The above-described vehicle information does not limit the types of vehicle information acquired by the vehicle information acquisition portion F1. The vehicle information can also include power supply states (for example, turning on or off of an ignition power supply) of the vehicle Hv, operation states of a parking brake, opened or closed states of doors, and locked or unlocked states of doors.

The surroundings information acquisition portion F2 acquires detected object data indicating positions of objects existing in the vehicle circumference from the circumference surveillance sensor 17. The detected object data contains position information about objects existing at least in the travel direction of the vehicle Hv. Therefore, the surroundings information acquisition portion F2 functions as a configuration that acquires the position information about objects existing in the travel direction of the vehicle Hv.

Figure 10:
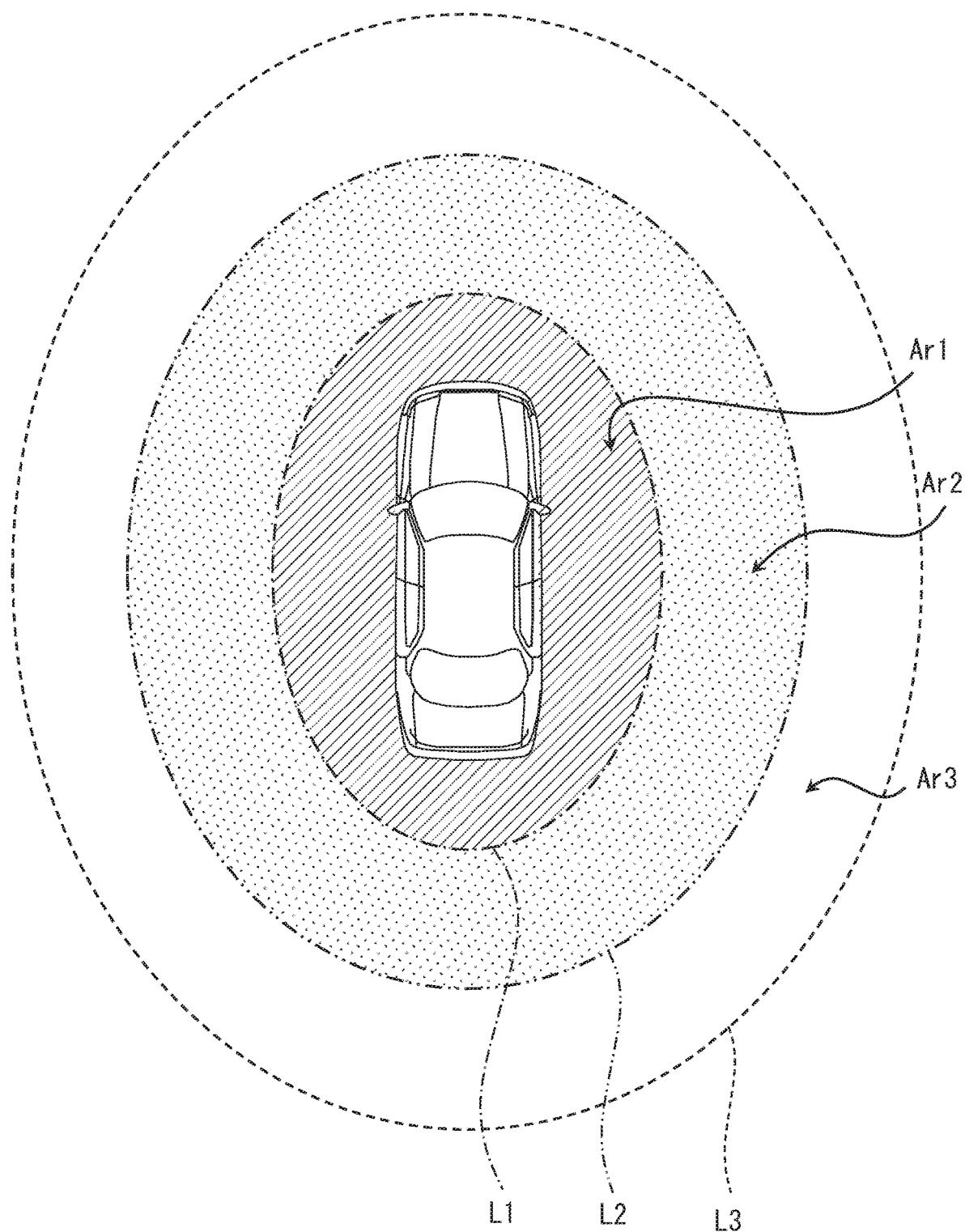
FIG. 10 is a schematic diagram illustrating an activation area, a marginal area, and an inactivation area.

The position determination portion F3 determines positions of the mobile device 2 based on communication situations in relation to the mobile device 2. As illustrated in FIG. 10, in one example, the present embodiment provides the vehicle Hv with an activation area Ar1, a marginal area Ar2, and an inactivation area Ar3. The position determination portion F3 determines whether the mobile device 2 exists in the activation area Ar1, the marginal area Ar2, or the inactivation area Ar3, based on results of the wireless communication with the mobile device 2. Since a user carries the mobile device 2, the determination of the position of the mobile device 2 is comparable to the determination of the position of the user. The communication situation may include information such as positions of the mobile device 2, positions of the vehicle Hv, the activation area Ar1, the marginal area Ar2, and the inactivation area Ar3.

The activation area Ar1 allows the user to perform the remote operation on the vehicle Hv by using the mobile device 2. In other words, the activation area Ar1 is comparable to an area that allows the control execution portion F6 (to be described) to control the vehicle Hv to travel based on the remote operation. The activation area Ar1 ranges shorter than a predetermined first distance from the vehicle Hv, for example. The first distance designates a range assumed to be the circumference of the vehicle Hv and is equal to three meters, for example. In one example of the present embodiment, it is assumed that the response area functions as the activation area Ar1. According to the present embodiment, the activation area Ar1 is set to a range of three meters from the vehicle Hv.

The marginal area Ar2 allows the user to perform the remote operation on the vehicle Hv by using the mobile device 2 only under the condition that a predetermined acceptance continuation condition is satisfied. For example, the marginal area Ar2 is longer than or equal to the predetermined first distance and is shorter than a second distance. The second distance just needs to be longer than the first distance by a certain degree (for example, 0.5 meters) as far as the BLE communication is available. The second distance is set to six meters, for example. The marginal area Ar2 is formed into a circle or a belt having a width of 0.5 meters or more.

The marginal area Ar2 is provided outside the activation area Ar1. The marginal area Ar2 is formed to be contiguous with the activation area Ar1. An inner boundary line of the marginal area Ar2 is comparable to the boundary line of the activation area Ar1. Dash-dot-dash line L1 in FIG. 10 conceptually illustrates the boundary between the activation area Ar1 and the marginal area Ar2. The configuration illustrated in FIG. 10 is comparable to a configuration where the relatively wide marginal area Ar2 includes the relatively narrow activation area Ar1.

The inactivation area Ar3 causes the remote operation ECU 12 to change an operation mode to a stop mode (to be described). The inactivation area Ar3 is formed at a distance longer than or equal to the second distance from the vehicle Hv, for example. The inactivation area Ar3 also includes the outside of an area (BLE communication area) that enables BLE communication between the BLE communication device 15 of the in-vehicle system 1 and the mobile device 2. The dash-dot-dot-dash line L2 in FIG. 10 conceptually illustrates the boundary (outer boundary line) between the marginal area Ar2 and the inactivation area Ar3. The broken line L3 in FIG. 10 conceptually illustrates the boundary of the BLE communication area.

Various methods can be used to determine positions of the mobile device 2. For example, the position determination portion F3 cooperates with the LF transmitters 13 and allows each LF transmitter 13 to transmit an LF polling signal at a predetermined cycle (for example, 200 milliseconds). The LF polling signal requests the mobile device 2 to return a response signal. The LF polling signal may or may not be a signal (that is, challenge signal) that contains the challenge code. The position determination portion F3 determines that the mobile device 2 exists in the activation area Ar1 when receiving a response signal from the mobile device 2 in reply to the LF polling signal.

The position determination portion F3 successively acquires the reception strength of a BLE signal transmitted from the mobile device 2 in cooperation with the BLE communication device 15. Based on the reception strength, the position determination portion F3 determines whether the mobile device 2 exists in the marginal area Ar2. Specifically, when the reception strength of a BLE signal transmitted from the mobile device 2 is smaller than a predetermined standby threshold value or no response signal is received from the mobile device 2, it is determined that the mobile device 2 exists in the inactivation area Ar3. When the reception strength of a BLE signal transmitted from the mobile device 2 is larger than or equal to the predetermined standby threshold value, it is determined that the mobile device 2 exists at least inside the outer boundary line L2 of the marginal area Ar2. The standby threshold value may be appropriately adjusted to form the intended marginal area Ar2 based on tests or simulations.

When the reception strength of a BLE signal transmitted from the mobile device 2 is larger than or equal to the standby threshold value and no response signal is received in reply to the LF polling signal, the position determination portion F3 determines that the mobile device 2 exists in the marginal area Ar2. When the reception strength of a BLE signal from the mobile device 2 is larger than or equal to the standby threshold value and a response signal is received in reply to the LF polling signal, it may be determined that the mobile device 2 exists in the activation area Ar1.

The BLE signal reception strength used to determine positions of the mobile device 2 may be an average value or a center value of the reception strength in the most recent period (for example, 400 milliseconds). An average value of the reception strength of a BLE signal from the mobile device 2 in the most recent period is comparable to a moving average of the reception strength of the BLE signal from the mobile device 2. Such a configuration can reduce risks of incorrectly determining positions of the mobile device 2 due to fluctuation components of the momentary reception strength. The process of determining positions of the mobile device 2 by transmitting and receiving the BLE signal from the mobile device 2 may be performed in parallel with (in other words, independently of) the process of periodically transmitting the LF signal as the LF polling signal.

The position determination portion F3 may determine whether the mobile device 2 exists in the activation area Ar1, based on the reception strength of the BLE signal from the mobile device 2. Positions of the mobile device 2 may be estimated through the use of the signal round-trip time required while the BLE communication device 15 transmits a BLE signal and receives a response signal from the mobile device 2, or the time of arrival (TOA) of a signal required while the mobile device 2 transmits the BLE signal and the in-vehicle system 1 receives the signal, instead of the reception strength. Besides, positions of the mobile device 2 may be estimated through the use of the angle of arrival (AOA) of signals indicating the direction of signals arriving from the mobile device 2.

The remote operation acceptance portion F5 uses determination results from the position determination portion F3, for example. Determination results from the position determination portion F3 may be supplied to the authentication ECU 11. For example, the authentication ECU 11 may transmit the challenge signal only when the position determination portion F3 determines that the mobile device 2 exists at least toward the inside of the outer boundary line L2 of the marginal area Ar2.

According to the present embodiment, the marginal area Ar2 is smaller than the BLE communication area so that the BLE communication area includes an area functioning as the inactivation area Ar3 inside. However, aspects of setting the marginal area Ar2 are not limited thereto. As another aspect, the marginal area Ar2 may apply to all areas outside the activation area Ar1 belonging to the BLE communication area. According to this setting, the position determination portion F3 can determine that the mobile device 2 exists at least inside the outer boundary line L2 of the marginal area Ar2, based on the successful reception of the BLE signal from the mobile device 2. When the BLE communication is unavailable, it is possible to determine that the mobile device 2 exists in the inactivation area Ar3.

The mode controller F4 controls operation states (operation modes) of the remote operation ECU 12. The operation modes of the remote operation ECU 12 according to the present embodiment include a permission mode, a stop mode, and a standby mode. The permission mode enables the remote operation to be accepted. In other words, the permission mode enables the user to remotely operate the vehicle Hv by using the mobile device 2. The stop mode corresponds to the operation mode that refuses the remote operation.

The operation mode of the remote operation ECU 12 is normally set to the stop mode. The remote operation ECU 12 transitions to the permission mode from the stop mode when the user existing in the activation area Ar1 or the vehicle compartment performs a predetermined validating operation on an input device mounted on the vehicle Hv or the mobile device 2. Specifically, the authentication ECU 11 performs the authentication process by using the user's validating operation as a trigger. When the authentication process succeeds, the operation mode transitions to the permission mode.

The validating operation allows the operation mode of the remote operation ECU 12 to transition from the stop mode to the permission mode. For example, the validating operation represents pressing a specified button in the vehicle or allowing the user to press the remote operation function button B2 when the BLE communication connection is established between the mobile device 2 and the in-vehicle system 1. It is preferable to appropriately design the specific contents of the validating operation. From another viewpoint, the stop mode as the operation mode refuses the remote operation and does not transition to the permission mode unless the user performs the validating operation. The transition from the permission mode to the stop mode is triggered by disconnection of the communication with the mobile device 2 as well as manual operation.

The standby mode is an intermediate operation state between the permission mode and the stop mode. The remote operation ECU 12 in the permission mode transitions to the standby mode when the position of the mobile device 2 moves from the activation area Ar1 to the marginal area Ar2. The standby mode enables the remote operation ECU 12 to transition to the permission mode without requiring the user to perform the predetermined validating operation when the mobile device 2 returns to the activation area Ar1 within a predetermined time elapsed since the mobile device 2 moves to the marginal area Ar2. The operation mode of the remote operation ECU 12 is comparable to the operation mode of the vehicle remote operation system 100 and the in-vehicle system 1. Operations of the mode controller F4 will be described in detail later.

The remote operation acceptance portion F5 accepts the user's remote operation based on a command signal transmitted from the mobile device 2. For example, when the remote operation acceptance portion F5 receives a parking instruction signal from the mobile device 2, the remote operation acceptance portion F5 accepts a travel instruction on parking as the remote operation by determining that the vehicle Hv is instructed to autonomously travel to a predetermined parking position. Namely, the remote operation acceptance portion F5 performs BLE communication with the mobile device 2 to accept the parking instruction operation performed by the user on the mobile device 2.

The remote operation acceptance portion F5 accepts the remote operation when the remote operation ECU 12 runs in the permission mode. As described later, the remote operation ECU 12 primarily runs in the permission mode when the mobile device 2 exists in the activation area Ar1. The remote operation acceptance portion F5 accepts the user's remote operation concerning the vehicle movement based on the existence of the mobile device 2 in the activation area Ar1.

The control execution portion F6 performs the vehicle control corresponding to the operation accepted by the remote operation acceptance portion F5. When the remote operation acceptance portion F5 accepts the parking instruction operation, for example, the control execution portion F6 allows the vehicle Hv to travel to a targeted parking position in cooperation with the steering ECU, the engine ECU, and the brake ECU. A travel route to the targeted parking position may be provided based on detected object data acquired by the surroundings information acquisition portion F2. When the presence of a pedestrian, for example, is detected on the travel route, the vehicle stops temporarily or the travel route is reorganized based on user instructions. Various methods can be used to detect the targeted parking position in advance based on detection results from a sonar, for example.

The notification processor F7 performs a process that notifies the user of various information by illuminating the communication lamp 18 in predetermined illumination patterns. Elements of the illumination pattern can include the light color, the number of times of illumination, activation or inactivation of blinking, the interval of blinking, or the like. The notification processor F7 cooperates with the BLE communication device 15 to perform a process that transmits a signal indicating a determination result from the position determination portion F3 to the mobile device 2 and notifies information about the position of the user (substantially the mobile device 2) in relation to the vehicle Hv. The operations of the notification processor F7 will be described in detail later.

(Mode Control Process)

Figure 11:
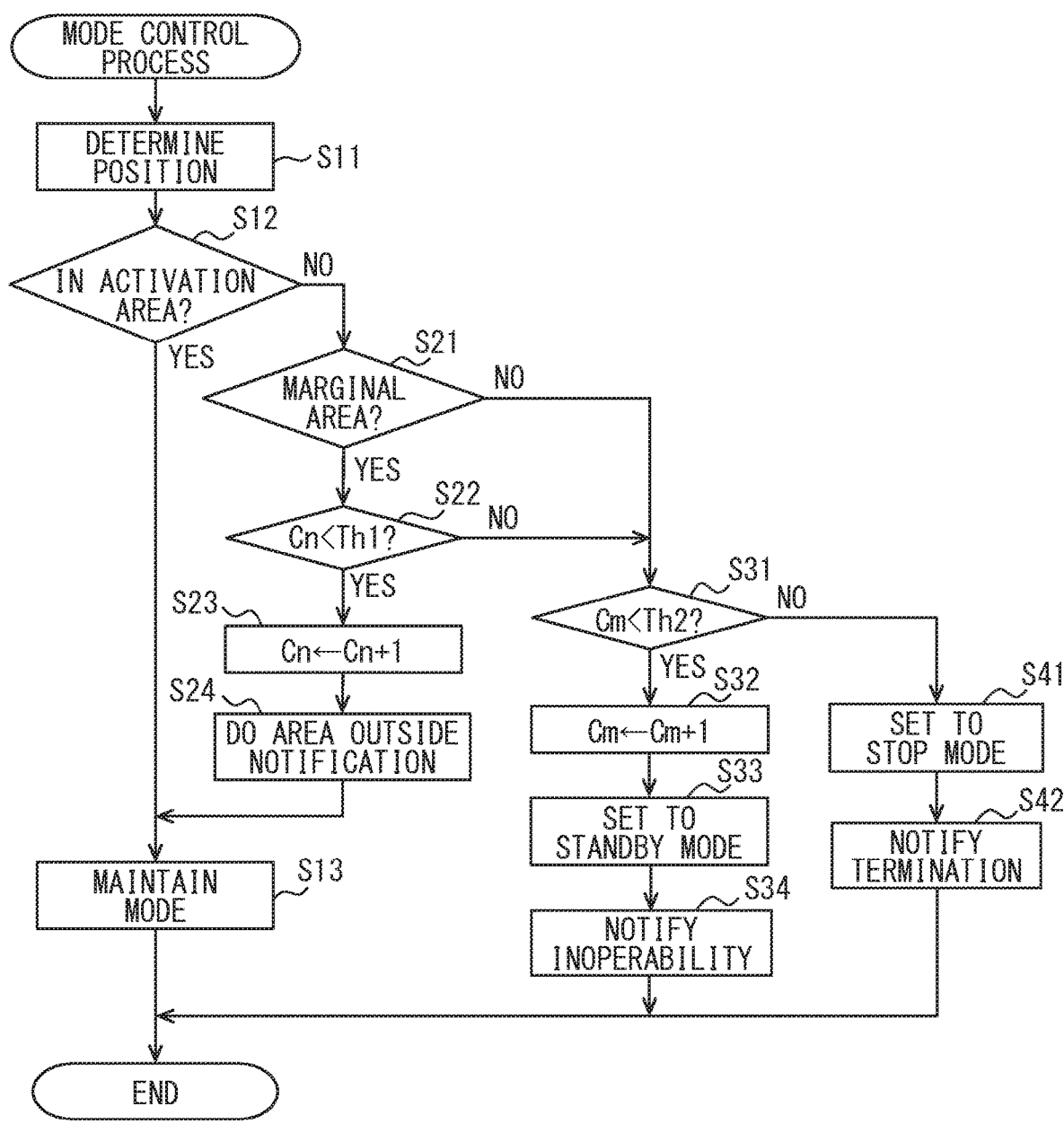
FIG. 11 is a flowchart illustrating a mode control process performed by the remote operation ECU.

The description below explains the operations of the remote operation ECU 12 with reference to the flowchart in FIG. 11. The flowchart in FIG. 11 illustrates a process (mode control process) that controls the operation mode of the remote operation ECU 12. The flowchart in FIG. 11 starts when the user performs the validating operation to change the stop mode to the permission mode. The process is performed at a predetermined monitoring cycle while the operation mode of the remote operation ECU 12 remains in the permission mode or the standby mode. It is advisable to set the monitoring cycle to a value smaller than or equal to one second such as 100 or 200 milliseconds.

When the user's validating operation changes the operation state of the remote operation ECU 12 from the stop mode to the permission mode, first departure counter Cn and second departure counter Cm as variable parameters to be used for the subsequent process are set to 0 (in other words, initialized). First departure counter Cn and second departure counter Cm are each set to an integer larger than or equal to zero. First departure counter Cn is comparable to a parameter indicating the time elapsed after the mobile device 2 moves from the activation area Ar1 to the marginal area Ar2. Second departure counter Cm is comparable to a parameter indicating the time elapsed after the mobile device 2 moves from the marginal area Ar2 or the activation area Ar1 to the inactivation area Ar3.

At S11, the position determination portion F3 determines the position of the mobile device 2 based on a result of wireless communication with the mobile device 2. Namely, it is determined whether the mobile device 2 exists in the activation area Ar1, the marginal area Ar2, or the inactivation area Ar3. Control proceeds to S12 upon completion of the process at S11.

At S12, the position determination portion F3 determines whether the mobile device 2 is determined to exist in the activation area Ar1 at S11. The determination at S12 is affirmed and control proceeds to S13 if the mobile device 2 is determined to exist in the activation area Ar1 at S11. Control proceeds to S21 if the mobile device 2 is not determined to exist in the activation area Ar1 at S11.

If the determination at S12 is affirmed, first departure counter Cn and second departure counter Cm are reset. The notification processor F7 allows the communication lamp 18 to illuminate in a predetermined illumination pattern (appropriate position pattern) if the mobile device 2 is determined to exist in the activation area Ar1. The user is thereby notified that the system recognizes the existence of the mobile device 2 in the activation area Ar1. The appropriate position pattern may allow the communication lamp 18 to slowly blink in green, for example.

At S13, the mode controller F4 sets the operation mode of the remote operation ECU 12 to the permission mode and terminates the process flow. The permission mode remains unchanged if the operation mode of the remote operation ECU 12 is already set to the permission mode. While the permission mode is active, the control execution portion F6 performs the vehicle control corresponding to a command signal transmitted from the mobile device 2. When the parking instruction signal is received, for example, the vehicle Hv is moved (traveled) toward the targeted parking position.

At S21, the position determination portion F3 determines whether the mobile device 2 is determined to exist in the marginal area Ar2 at S11. The determination at S21 is affirmed and control proceeds to S22 if the mobile device 2 is determined to exist in the marginal area Ar2 at S11. Control proceeds to S31 if the mobile device 2 is not determined to exist in the marginal area Ar2 at S21. The determinations at S12 and S21 are negated when the mobile device 2 exists in the inactivation area Ar3.

At S22, the mode controller F4 determines whether first departure counter Cn is set to be smaller than predetermined first return limit value Th1. The determination at S22 is affirmed and control proceeds to S23 if first departure counter Cn is set to be smaller than predetermined first return limit value Th1. The determination at S22 is negated and control proceeds to S31 if first departure counter Cn is set to be larger than or equal to first return limit value Th1.

At S23, the mode controller F4 increments first departure counter Cn by one and control proceeds to S24. The process flow is performed at a predetermined monitoring cycle while the operation mode of the remote operation ECU 12 is set to the permission mode or the standby mode. First departure counter Cn indicates the number of times to perform the process flow while the mobile device 2 exists in the marginal area Ar2. First departure counter Cn indicates the time elapsed after the mobile device 2 moves from the activation area Ar1 to the marginal area Ar2.

At S24, the notification processor F7 performs an out-of-area notification process. The out-of-area notification process notifies the user that the mobile device 2 exists outside the activation area Ar1. In one example, the notification processor F7 according to the present embodiment allows the communication lamp 18 to illuminate in a predetermined illumination pattern (out-of-area pattern). The out-of-area pattern is available as the illumination pattern that allows the communication lamp 18 to blink in yellow at a predetermined interval. The out-of-area pattern is set to be different from the appropriate position pattern as the illumination pattern.

At S24, the notification processor F7 performs the out-of-area notification process in cooperation with the BLE communication device 15 to transmit an out-of-area notification signal to the mobile device 2. The out-of-area notification signal is provided as a BLE signal to notify the mobile device 2 that the mobile device 2 exists outside the activation area Ar1. When receiving the out-of-area notification signal, the mobile device 2 keeps displaying the remote operation screen and concurrently performs a process (mobile-device-side notification process) to notify the user that the mobile device 2 exists outside the activation area Ar1. For example, the mobile device 2 performs the mobile-device-side notification process such as generating an alarm sound from the speaker 27 or vibrating the vibrator 28.

When receiving the out-of-area notification signal, the mobile device 2 may perform the mobile-device-side notification process such as allowing the display 25 to display a message or an icon (out-of-activation-area notification information) notifying that the mobile device 2 exists outside the activation area Ar1. The out-of-area notification signal is comparable to a signal that instructs the mobile device 2 to keep displaying a predetermined remote operation screen and concurrently perform the mobile-device-side notification process.

Control proceeds to S13 upon completion of the process at S24. The operation mode of the remote operation ECU 12 changes to or stays in the permission mode. Then, the process flow terminates. Even if the mobile device 2 exists in the marginal area Ar2, the user remains being able to remotely operate the vehicle Hv while the out-of-area notification process is performed. In other words, even if the mobile device 2 exists in the marginal area Ar2, the user remains being able to remotely operate the vehicle Hv until first departure counter Cn reaches first return limit value Th1.

First return limit value Th1 specifies the time (return limit time) during which the mobile device 2 is permitted to leave the activation area Ar1. The return limit time is set to three to five seconds, for example. It is preferable to appropriately design the return limit time in consideration of speeds of user reactions to the out-of-area notification process, for example. First return limit value Th1 is set to a value resulting from dividing the return limit time by the monitoring cycle.

The acceptance continuation condition requires that first departure counter Cn is smaller than first return limit value Th1 or, in other words, the time elapses shorter than or equal to the return limit time after the position of the mobile device 2 changes from the activation area Ar1 to the outside of the activation area Ar1. According to the present embodiment, the acceptance continuation condition also requires that the mobile device 2 exists in the marginal area Ar2 outside the activation area Ar1.

At S31, the mode controller F4 determines whether the second departure counter Cm is set to be smaller than a predetermined second return limit value Th2. The determination at S31 is affirmed if the second departure counter Cm is set to be smaller than second return limit value Th2. Control then proceeds to S32. The determination at S31 is negated if the second departure counter Cm is set to be greater than or equal to second return limit value Th2. Control then proceeds to S41.

At S32, the mode controller F4 increments the second departure counter Cm by one and proceeds to step S33. The process flow is performed at a predetermined monitoring cycle while the operation mode of the remote operation ECU 12 is set to the permission mode or the standby mode. Therefore, the second departure counter Cm indicates the time elapsed from the return limit time for the mobile device 2 to remain in the marginal area Ar2 or the duration time for the mobile device 2 to remain in the inactivation area Ar3.

Second return limit value Th2 specifies the remaining time (stop margin time) for the mobile device 2 to transition to the stop mode due to the exit from the activation area Ar1. The stop margin time is set to three to five seconds, for example. It is preferable to appropriately design the stop margin time in consideration of speeds of user reactions to a standby notification process or the like. Second return limit value Th2 is set to a value resulting from dividing the stop margin time by the monitoring cycle.

At S33, the mode controller F4 sets the operation mode of the remote operation ECU 12 to the standby mode and terminates the process flow. The standby mode is maintained when the operation mode of the remote operation ECU 12 is already set to the standby mode. While the standby mode is maintained, the remote operation acceptance portion F5 does not accept the remote operation from the user. The control execution portion F6 accordingly stops the vehicle Hv. The standby mode keeps operating the system concerning the remote operation and transitions to the permission mode when the mobile device 2 returns to the activation area Ar1.

At S34, the notification processor F7 performs an inoperability notification process. The inoperability notification process notifies the user that the vehicle remote operation system 100 temporarily does not accept the remote operation (and therefore enters the standby mode) because the mobile device 2 leaves the activation area Ar1. The notification processor F7 according to the present embodiment allows the communication lamp 18 to illuminate in a predetermined illumination pattern (standby notification pattern), for example. The standby notification pattern differs from the appropriate position pattern and the out-of-area pattern. The standby notification pattern allows the communication lamp 18 to blink in red at an interval shorter than that for the out-of-area notification process, for example.

The notification processor F7 performs the inoperability notification process in cooperation with the BLE communication device 15 to transmit an inoperability signal to the mobile device 2. The inoperability signal is provided as a BLE signal to notify that the remote operation ECU 12 transitions to the standby mode. When receiving the inoperability signal, the mobile device 2 disables the user from selecting the remote operation button B4 by turning off the display of the remote operation button B4, for example. Consequently, the user cannot perform the remote operation.

When receiving the inoperability signal, the mobile device 2 allows the display 25 to display a message or an icon (standby notification information) notifying that the remote operation ECU 12 transitions to the standby mode. When receiving the inoperability signal, the mobile device 2 may display approach guidance information in addition to or in place of the standby notification information. The approach guidance information is a message or an icon image prompting the user to approach the vehicle Hv. The inoperability signal is comparable to a signal notifying that the remote operation ECU 12 transitions to the standby mode or that the user needs to approach the vehicle Hv. Upon completion of the process at S34, the process flow terminates once. After the predetermined monitoring cycle, the process restarts from S11.

At S41, the mode controller F4 sets the operation mode of the remote operation ECU 12 to the stop mode and proceeds to step S42. The process flow does not start after the operation mode of the remote operation ECU 12 is set to the stop mode at S41 until the user performs a specified validating operation again.

At S42, the notification processor F7 performs a termination notification process. The termination notification process notifies the user that the vehicle remote operation system 100 transitions to the stop mode. The notification processor F7 according to the present embodiment allows the communication lamp 18 to illuminate in a predetermined illumination pattern (termination notification pattern), for example. The termination notification pattern differs from the appropriate position pattern, the out-of-area pattern, and the standby notification pattern. The notification processor F7 uses the termination notification pattern that allows the communication lamp 18 to steadily light for a predetermined period (for example, four seconds), for example.

The notification processor F7 transmits a termination notification signal to the mobile device 2 in cooperation with the BLE communication device 15. The termination notification signal indicates the termination of operations of the system that provides the remote operation. When receiving the termination notification signal, the mobile device 2 allows the display 25 to display a message or an icon (termination notification information) indicating that the vehicle remote operation system 100 transitions to the stop mode. When receiving the inoperability signal, the mobile device 2 may display operation guidance information as well as the termination notification information. The operation guidance information is a message or an icon image prompting the user to perform the validating operation again.

The vehicle Hv according to the above-described configuration is provided with the conceptual areas such as the relatively narrow activation area Ar1 and the relatively wide marginal area Ar2 for the user to use the remote operation function. The marginal area Ar2 is formed to be contiguous with the activation area Ar1. The remote operation ECU 12 allows the vehicle Hv to travel based on the remote operation when the mobile device 2 is identified to exist in the activation area Ar1 based on the result of the wireless communication with the mobile device 2.

The remote operation ECU 12 does not immediately transition to the stop state even when the mobile device 2 moves from the activation area Ar1 to the marginal area Ar2. The remote operation remains valid until the predetermined return limit time elapses after the mobile device 2 moves from the activation area Ar1 to the marginal area Ar2.

Besides, the user is notified that the mobile device 2 leaves the activation area Ar1 when the mobile device 2 moves from the activation area Ar1 to the marginal area Ar2. The user can return to the activation area Ar1 within the return limit time and prevent the vehicle remote operation system 100 from transitioning to the stop state.

It is possible to reduce the risks of repeatedly interrupting and restarting the remote control over the vehicle even when the user changeably stays inside or outside the activation area Ar1. As a result, user-friendliness can be improved.

Besides, the communication lamp 18 is provided for the vehicle Hv as a remote operation target and notifies the user in which area the mobile device 2 is determined to exist by the system. According to this configuration, the user can roughly recognize the invisible boundary of the activation area Ar1 based on the illumination patterns of the communication lamp 18. The user can recognize whether the mobile device 2 and the user exist in the activation area Ar1 without looking away from the vehicle Hv as a remote operation target.

The remote operation ECU 12 uses the BLE communication device 15 to determine whether the mobile device 2 exists in the marginal area Ar2. The remote operation ECU 12 uses the LF transmitter 13 and the RF communication device 14 to determine whether the mobile device 2 exists in the activation area Ar1. Generally, it is difficult to highly accurately determine whether the mobile device 2 exists in a given area (in other words, at a given position), based on BLE signals. The BLE communication uses a radio wave at 2.4 GHz, easily reflecting off objects. The reception strength may go to a low level even when the mobile device 2 exists in the activation area Ar1.

A radio wave at 200 kHz or less provides a relatively long wavelength. A range of several meters to several tens of meters from the vehicle is comparable to a near field for the LF transmitter 13. In the near field, a wireless signal transmitted from the LF transmitter 13 attenuates inversely with the cube of the distance, making it easy to highly accurately form a response area for the LF transmitter 13. Therefore, this configuration can determine whether the mobile device 2 exists in the activation area Ar1 more accurately than the configuration of using the BLE communication to determine whether the mobile device 2 exists in the activation area Ar1.

(First Modification)

The first embodiment discloses the aspect in which the mobile device 2 uses the RF communication device 23 to return a response to an LF signal. However, the present disclosure is not limited thereto. The mobile device 2 may use the BLE communication to return a response to an LF signal. According to this configuration, the mobile device 2 need not include the RF communication device 23. The in-vehicle system 1 need not include the RF communication device 14.

(Second Modification)

The first embodiment discloses the aspect in which the remote operation ECU 12 uses the LF transmitter 13 to determine whether the mobile device 2 exists in the activation area Art. However, the present disclosure is not limited thereto. For example, when there occurs a noise whose level is unacceptable for the first vehicular frequency, it may be preferable to determine whether the mobile device 2 exists in the activation area Ar1, based on results of the BLE communication. The in-vehicle system 1 may include multiple techniques of wireless communication with the mobile device 2. Then, it may be preferable to select a communication technique (position determination technique) used to determine whether the mobile device 2 exists in the activation area Ar1, according to noise levels of the communication techniques.

The mobile device 2 according to the present modification detects a noise level (LF noise level) of the first vehicular frequency and reports a detection result to the remote operation ECU 12 by using an RF signal or a BLE signal. The LF receiver 22 may detect the LF noise level. The RF communication device 14 of the in-vehicle system 1 detects a noise level (RF noise level) of the second vehicular frequency and reports a detection result to the remote operation ECU 12. The in-vehicle system 1 may include a function to detect the LF noise level. For example, the LF transmitter 13 may detect the LF noise level.

The BLE communication device 15 may observe the noise level of a carrier frequency and may or may not report the noise level to the remote operation ECU 12. The BLE implements communication while using the frequency hopping technique and is therefore hardly prone to receive the effect of noise. To simplify the configuration, the BLE communication device 15 does not report the noise level.

Figure 12:
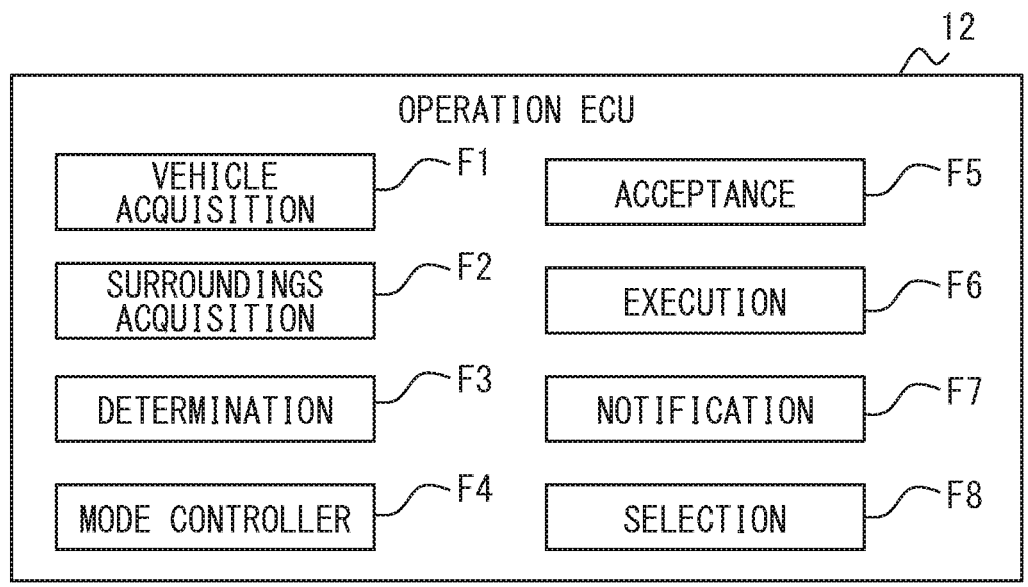
FIG. 12 is a function block diagram illustrating the remote operation ECU according to a second modification.

As illustrated in FIG. 12, the remote operation ECU 12 according to the present modification includes a determination technique selection portion F8. The determination technique selection portion F8 switches between position determination techniques based on the LF noise level supplied from the mobile device 2 and the RF noise level supplied from the RF communication device 14.

The determination technique selection portion F8 selects the LF transmitter 13 as a position determination technique when the LF noise level is smaller than a predetermined threshold value (allowable LF threshold value). Suppose the determination technique selection portion F8 selects the LF transmitter 13 as a position determination technique. In this case, similarly to the embodiment, the position determination portion F3 determines whether the mobile device 2 exists in the activation area Ar1 based on whether a response is received from the mobile device 2 in reply to an LF polling signal transmitted from the LF transmitter 13. A noise level smaller than the allowable LF threshold value is comparable to an allowable level.

The determination technique selection portion F8 selects the BLE communication as a position determination technique when the LF noise level is greater than or equal to the allowable LF threshold value. When the determination technique selection portion F8 selects the BLE communication as a position determination technique, the position determination portion F3 determines whether the mobile device 2 exists in the activation area Ar1, based on a communication result of the BLE communication with the mobile device 2.

For example, the position determination portion F3 determines that the mobile device 2 exists in the activation area Ar1 when the reception strength of a BLE signal from the mobile device 2 is larger than or equal to a predetermined activation threshold value. The position determination portion F3 determines that the mobile device 2 exists outside the activation area Ar1 when the reception strength of a BLE signal from the mobile device 2 is smaller than the activation threshold value. The activation threshold value is used to determine whether the mobile device 2 exists in the activation area Ar1. The reception strength used for comparison with the activation threshold value may be available as an average value, a center value, the minimum value, or the maximum value for reception strengths within the most recent predetermined time (for example, 400 milliseconds).

It is possible to easily determine that the mobile device 2 exists in the activation area Ar1 when the position of the mobile device 2 is determined by comparing the maximum value of the reception strength with the activation threshold value in the most recent predetermined time. User-friendliness can be improved. It is possible to improve the security and the safety of the vehicle Hv when the position of the mobile device 2 is determined by comparing the minimum value of the reception strength with the activation threshold value in the most recent predetermined time.

The remote operation ECU 12 may instruct the mobile device 2 to return a response signal in reply to the LF polling signal by using the BLE communication when the LF noise level is smaller than the allowable LF threshold value and the RF noise level is greater than or equal to an allowable RF threshold value. This configuration can reduce the effect of noise in the second vehicular frequency on the vehicle remote operation system 100.

(Third Modification)

The first embodiment discloses the configuration in which the in-vehicle system and the mobile device 2 perform the BLE communication. However, the communication system between the in-vehicle system 1 and the mobile device 2 is not limited thereto. The in-vehicle system 1 and the mobile device 2 may perform wireless communication (near-field communication) compliant with the near field communication standard such as Wi-Fi (registered trademark) or ZigBee (registered trademark) instead of Bluetooth (registered trademark). The in-vehicle system 1 and the mobile device 2 may be able to perform the communication (near-field communication) compliant with a specified near field communication standard that allows for a communication range of one to several tens of meters. There may be a communication device that performs wireless communication such as Bluetooth, Wi-Fi, or ZigBee compliant with the communication standard ensuring the communication distance of eight meters or longer. Such a communication device is comparable to a near-field communication device. The BLE communication device 15 is comparable to the near-field communication device.

The in-vehicle system 1 and the mobile device 2 may be capable of wireless communication based on the UWB-IR (Ultra-Wide Band-Impulse Radio) system. In this case, the in-vehicle system 1 and the mobile device 2 can transmit and receive impulse radio waves (impulse signal) used for the ultrawideband (UWB) communication. The impulse signal used for the UWB communication features the pulse width of an extremely short time (for example, two nanoseconds) and the bandwidth of 500 MHz or more (ultrawideband).

Frequency bands (UWB bands) available for the UWB communication include 3.1 GHz through 10.6 GHz, 3.4 GHz through 4.8 GHz, 7.25 GHz through 10.6 GHz, and 22 GHz through 29 GHz, for example. The impulse signal requires the bandwidth of at least 500 MHz and may use the bandwidth of 1.5 GHz or more.

The UWB-IR can use various modulation systems such as the PPM (pulse position modulation) system that performs modulation at the position where a pulse occurs. Specifically, the modulation systems include on-off keying (OOK), pulse width modulation (PWM), pulse-amplitude modulation (PAM), and pulse-code modulation (PCM), for example. The on-off keying modulation represents information (for example, 0 and 1) based on the presence or absence of an impulse signal. The pulse width modulation represents information based on pulse widths. The pulse-amplitude modulation represents information based on impulse signal amplitudes. The pulse-code modulation represents information based on pulse combinations.

Figure 13:
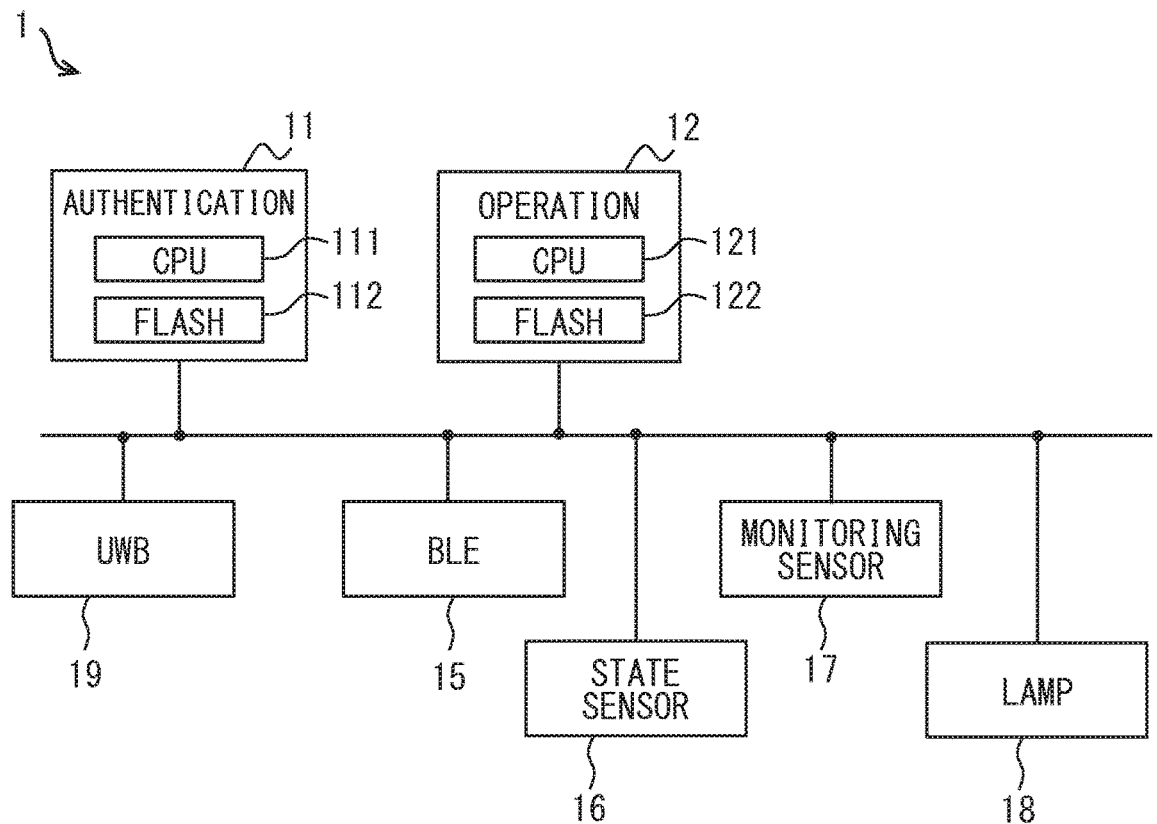
FIG. 13 is a function block diagram illustrating a configuration of the in-vehicle system according to a third modification.

As illustrated in FIG. 13, for example, the in-vehicle system 1 may include a UWB communication device 19 in place of the LF transmitter 13 and the RF communication device 14 and may be capable of the UWB communication with the mobile device 2. The multiple UWB communication devices 19 may be provided. For example, at least one UWB communication device 19 is preferably provided for each of the inside of the vehicle compartment, a right side surface portion, and a left side surface portion. The right side surface portion signifies the outside surface portion of a door provided at the right of the vehicle or a pillar portion (for example. B pillar), for example. The left side surface portion signifies the outside surface portion of a door provided at the left of the vehicle or a pillar portion, for example.

The UWB communication can form a communication area of ten meters or more and can detect a distance to the mobile device 2 at a relatively high level. Various methods such as TOA can be used to estimate a distance from the UWB communication device 19 to the mobile device 2. When the multiple UWB communication devices 19 are provided, for example, the position of the mobile device 2 relative to the vehicle Hv can be estimated by combining distances from the UWB communication devices 19 to the mobile device 2 and positions of mounting the UWB communication devices 19. It is possible to determine whether the mobile device 2 exists in the activation area Ar1 or the marginal area Ar2. The UWB communication device 19 is also comparable to a near-field communication device.

(Fourth Modification)

The remote operation ECU 12 may enlarge the activation area Ar1 as the travel progresses based on the remote operation. This configuration can reduce the need for the user to move along with the travel of the vehicle Hv and improve user-friendliness.

Figure 14:
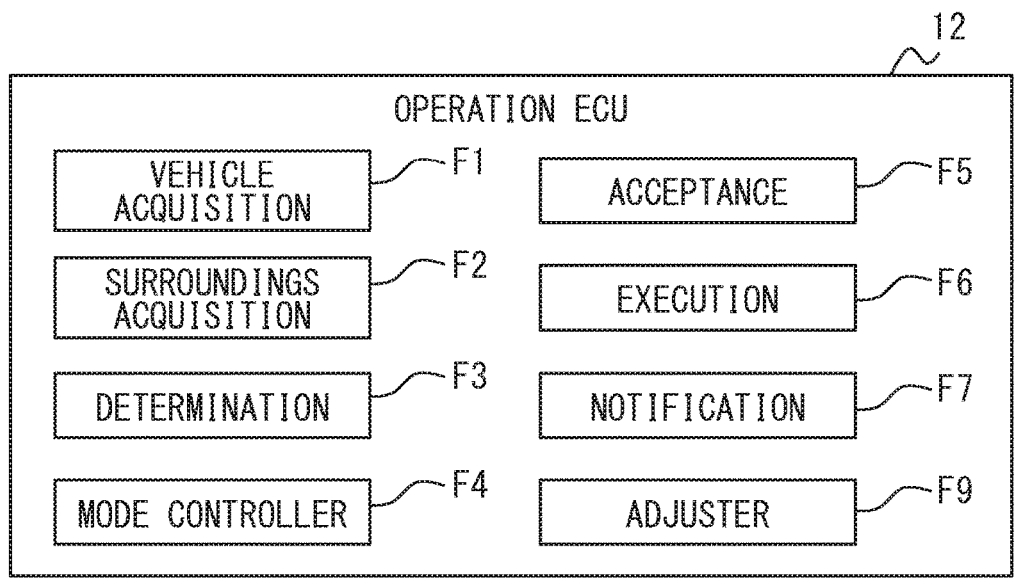
FIG. 14 is a function block diagram illustrating the remote operation ECU according to a fourth modification.

As illustrated in FIG. 14, the remote operation ECU 12 according to the fourth modification includes an area adjuster F9. The area adjuster F9 enlarges the activation area Ar1 as the vehicle Hv moves based on the remote operation. As the vehicle Hv travels, the area adjuster F9 enlarges the activation area Ar1 opposite the direction in which the vehicle Hv travels, in one example.

Figure 15:
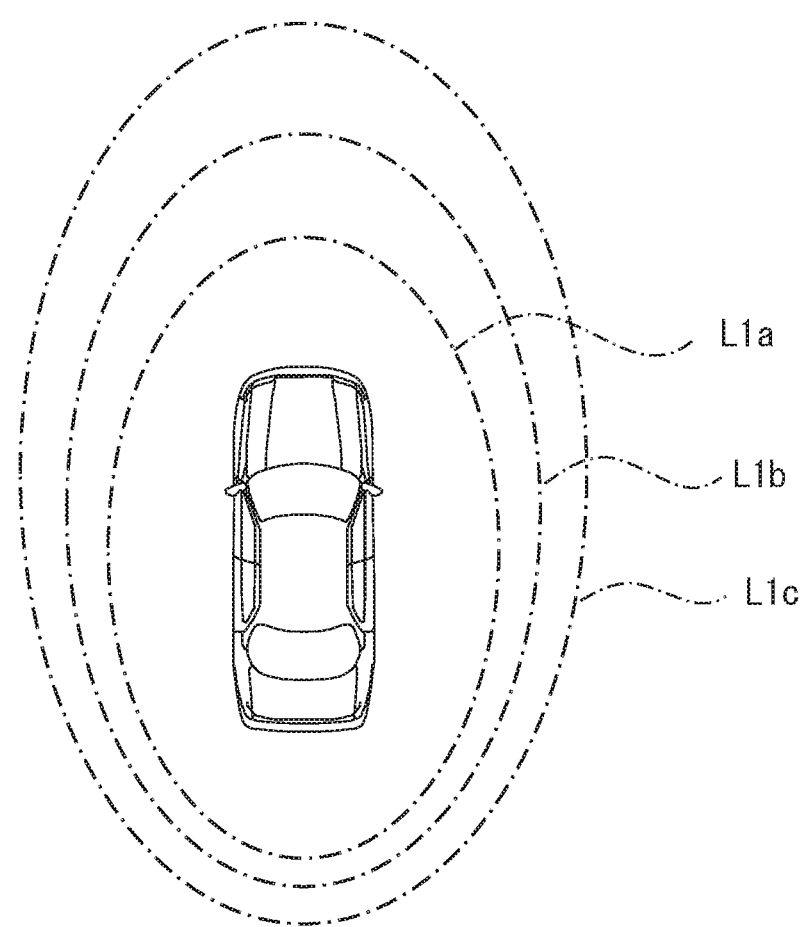
FIG. 15 is a conceptual diagram illustrating operations of an area adjuster.

FIG. 15 illustrates the vehicle moving backward. For example, the area adjuster F9 enlarges the activation area Ar1 in front of the vehicle as the vehicle moves backward. L1a in FIG. 15 conceptually illustrates the boundary of the activation area Ar1 at the time when the vehicle starts moving backward. L1b conceptually illustrates the boundary of the activation area Ar1 at the time when the vehicle moves backward approximately 1 m. L1c conceptually illustrates the boundary of the activation area Ar1 at the time when the vehicle moves backward approximately 2 m. When the vehicle moves backward, the user is expected to exist directly or diagonally in front of the vehicle. It is possible to prevent the user's position from leaving the activation area Ar1 by enlarging the activation area Ar1 in front of the vehicle as the vehicle Hv moves backward based on the remote operation.

There has been disclosed the aspect in which the area adjuster F9 provides the control to enlarge the activation area Ar1 in front of the vehicle as the vehicle Hv moves backward. However, the present disclosure is not limited thereto. The area adjuster F9 may enlarge the activation area Ar1 entirely (in all directions) as the vehicle Hv travels.

The adjustment of the activation area Ar1 can be implemented by various methods. For example, it is supposed that the mobile device 2 is determined to exist in the activation area Ar1 based on the result that the position determination portion F3 receives a response signal in reply to the LF polling signal. Then, it is possible to practically enlarge the activation area Ar1 by increasing the transmission strength of the LF polling signal or decreasing the response threshold value for the mobile device 2.

Alternatively, when the position determination portion F3 estimates a detailed position (for example, a position coordinate) of the mobile device 2 and the mobile device 2 is determined to exist in the activation area Ar1 based on an estimation result, it may be preferable to dynamically adjust parameters that mainly specify the size and the shape of the activation area Ar1. The detailed position of the mobile device 2 can be calculated based on a communication result from the UWB communication with the mobile device 2, for example. Moreover, when the mobile device 2 is determined to exist in the activation area Ar1 based on the reception strength of a BLE signal from the mobile device 2, it may be preferable to decrease the activation threshold value as the vehicle Hv travels.

(Fifth Modification)

Figure 16:
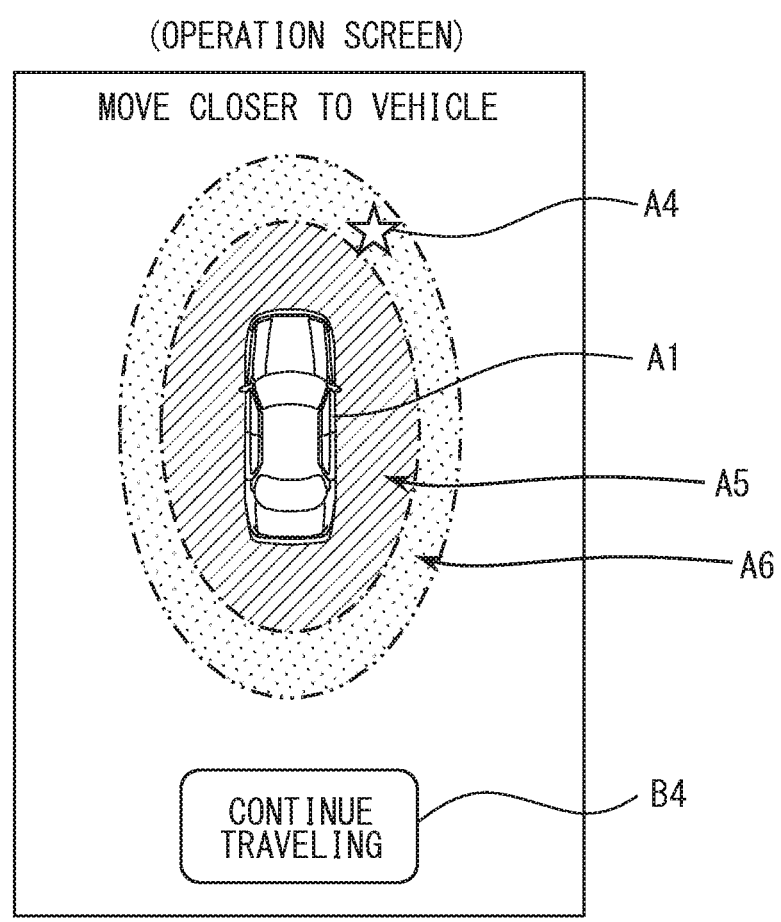
FIG. 16 is a diagram illustrating a modification of the remote operation screen.

As illustrated in FIG. 16, the mobile device 2 may display the remote operation screen including the remote operation button B4 for the parking instruction and information representing the position (or a determination result from the position determination portion F3) of the mobile device 2 relating to the activation area Ar1 or the marginal area Ar2. In FIG. 16, an icon A4 represents the position of the mobile device 2. An image A5 represents the activation area Ar1. An image A6 represents the marginal area Ar2. The screen configuration in FIG. 16 enables the user to perceive a determination result from the position determination portion F3, further improving user-friendliness. According to the remote operation screen in FIG. 16, the position determination portion F3 determines that the mobile device 2 exists in the marginal area Ar2.

In cooperation with the BLE communication device 15, the notification processor F7 according to the present modification transmits data indicating the result of determining the position of the mobile device 2 to the mobile device 2 and allows the display 25 to display an image that represents the positional relationship between the activation area Ar1 and the mobile device 2. The mobile device 2 performs the BLE communication to acquire a determination result from the position determination portion F3 and reflects the result on the remote operation screen. The display controller G1 may preferably provide blinking, for example, to highlight the image of an area where the mobile device 2 exists.

(ECU Configuration)

The remote operation ECU can provide the techniques and/or functions in the form of the software recorded in a tangible memory device and a computer to execute the software, only the software, only the hardware, or a combination of these. For example, the remote operation ECU can be provided as an electronic circuit as hardware, namely, as a digital or analog circuit including many logic circuits. Alternatively, the remote operation ECU can be provided as a single computer or a computer resource linked by a data communication apparatus. For example, other ECUs (for example, a body ECU) may partially include the functions provided by the remote operation ECU according to the present embodiment. The same applies to the authentication ECU. The remote operation ECU may include all or part of the functions included in the authentication ECU. The authentication ECU may include all or part of the functions included in the remote operation ECU.

(Mobile Device Configuration)

The mobile device may just need to be carried by a user and include a function as an electronic key for the vehicle Hv. Specifically, the function as an electronic key for the vehicle Hv transmits a signal (for example, a response signal) containing the information to attest the key for the vehicle Hv based on a request from the in-vehicle system. The mobile device may be available as a small device widely known as a smart key formed into a rectangle, an oval (like a key fob), or a card. The mobile device may be configured as a wearable device attached to the user's finger or arm. The mobile device may be also available as an information processing terminal such as a smartphone or a tablet device.

The controller, the processor, and the method therefor which have been described in the present disclosure may be also realized by a dedicated computer which constitutes a processor programmed to execute one or more functions concretized by computer programs. Alternatively, the controller and the method described in the present disclosure may be implemented by a special purpose computer configured as a processor with a special purpose hardware logic circuits. Alternatively, the controller and the method described in the present disclosure may be implemented by one or more dedicated computers configured by a combination of a processor executing a computer program and one or more hardware logic circuits. The computer programs may be stored, as instructions to be executed by a computer, in a tangible non-transitory computer-readable medium.

It is noted that a flowchart or the process of the flowchart in the present disclosure includes multiple steps (also referred to as sections), each of which is represented, for instance, as S11. Further, each step can be divided into several sub-steps while several steps can be combined into a single step.

In the above, the embodiment, the configuration, an aspect of the vehicle remote operation system according to the present disclosure are exemplified. However, the present disclosure is not limited to every embodiment, every configuration and every aspect related to the present disclosure are exemplified. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A vehicle remote operation system configured to perform control to move a vehicle based on wireless communication with a mobile device carried by a user of the vehicle, the vehicle remote operation system comprising:
a communication device configured to perform the wireless communication with the mobile device;
a position determination portion configured to determine whether the mobile device exists in an activation area predetermined for the vehicle, based on a communication situation between the communication device and the mobile device;
a remote operation acceptance portion configured to accept a remote operation as a user instruction operation to move the vehicle via the mobile device based on a result that the position determination portion determines that the mobile device exists in the activation area;
a control execution portion configured to perform control corresponding to a content of the remote operation accepted by the remote operation acceptance portion; and
a notification processor configured to notify the user that a position of the mobile device changes from an inside of the activation area to an outside of the activation area via the mobile device or an instrument mounted on the vehicle,
wherein:
the remote operation acceptance portion is configured to accept the remote operation while a predetermined acceptance continuation condition is satisfied even when the position of the mobile device changes from the inside of the activation area to the outside of the activation area;
the position determination portion is configured to determine whether the mobile device exists in a marginal area formed adjacently to the activation area in the outside of the activation area, based on the communication situation with the mobile device;
the remote operation acceptance portion is configured to accept the remote operation on condition that the mobile device exists in the marginal area until a predetermined return limit time elapses after a time when the position of the mobile device changes from the activation area to the marginal area;
the position determination portion is configured to determine whether the mobile device exists in an inactivation area outside the marginal area corresponding to the vehicle, based on the communication situation with the mobile device; and
the remote operation acceptance portion is configured not to accept the remote operation when the position of the mobile device changes from the marginal area to the inactivation area or when a time for which the mobile device exists in the marginal area exceeds the return limit time.

2. The vehicle remote operation system according to claim 1 further comprising:
an operation mode that includes
a stop mode that stops a system operation,
a permission mode capable of accepting the remote operation, and
a standby mode that is an intermediate state between the permission mode and the stop mode; and
a mode controller configured to control the operation mode of the vehicle remote operation system,
wherein:
the vehicle remote operation system changes the operation mode from the stop mode to the permission mode based on a result that the user performs a predetermined validating operation on an input device mounted on the vehicle or the mobile device;
the standby mode is an operation mode that does not accept the remote operation and is configured to transition to the permission mode without the validating operation based on a result that the mobile device returns to the inside of the activation area;
the mode controller is configured to
set the operation mode to the standby mode when a time for which the mobile device continuously stays in the marginal area is longer than or equal to the return limit time,
maintain the standby mode when a time for which the mobile device continuously stays in the inactivation area is shorter than a predetermined stop margin time even in a case where the mobile device enters the inactivation area, and
set the operation mode to the stop mode when the time for which the mobile device continuously stays in the inactivation area is longer than or equal to the stop margin time.

3. The vehicle remote operation system according to claim 2, wherein
when the mode controller sets the operation mode to the standby mode, the notification processor is configured to notify the user that the mode controller sets the operation mode to the standby mode via the mobile device or the instrument mounded on the vehicle.

4. The vehicle remote operation system according to claim 1, further comprising:
a near-field communication device that is the communication device and is configured to perform the wireless communication compliant with a communication standard specifying a communication distance of eight meters or longer,
wherein:
the marginal area is set to an entire area that
is in a range where the near-field communication device is configured to perform the wireless communication and
is outside the activation area.

5. The vehicle remote operation system according to claim 1, comprising:
an area adjuster configured to enlarge a range regarded as the activation area as the vehicle moves.

6. The vehicle remote operation system according to claim 1, comprising:
the communication device that includes
a first communication device configured to perform the wireless communication with the mobile device by using a radio wave lower than or equal to 200 kHz and
a second communication device configured to perform the wireless communication with the mobile device by using a radio wave higher than or equal to 1 GHz,
wherein:
the position determination portion is configured to determine whether the mobile device exists in the activation area, based on the communication situation between the first communication device and the mobile device when a noise level of a frequency used by the first communication device for wireless communication satisfies a predetermined allowable level; and the position determination portion is configured to determine whether the mobile device exists in the activation area, based on the communication situation between the second communication device and the mobile device when the noise level of a frequency used by the first communication device for the wireless communication exceeds the allowable level.

7. The vehicle remote operation system according to claim 6, wherein the first communication device and the second communication device are mounted on the vehicle.

8. The vehicle remote operation system according to claim 1, wherein the mobile device is a communication terminal that includes a display; and the notification processor is configured to
cooperate with the communication device,
transmit data representing a positional relationship between the activation area and the mobile device to the mobile device, and
allow the display to display an image representing a positional relationship between the activation area and the mobile device.

9. The vehicle remote operation system according to claim 1 further comprising:

an operation mode that includes
a stop mode that stops a system operation,
a permission mode capable of accepting the remote operation, and
a standby mode; and a mode controller configured to control the operation mode of the vehicle remote operation system, wherein:

the vehicle remote operation system changes the operation mode from the stop mode to the permission mode based on a result that the user performs a predetermined validating operation on an input device mounted on the vehicle or the mobile device;

the standby mode is an operation mode that does not accept the remote operation and is configured to transition to the permission mode without the validating operation based on a result that the mobile device returns to the inside of the activation area;

the mode controller is configured to
set the operation mode to the standby mode when a time for which the mobile device continuously stays in the marginal area is longer than or equal to the return limit time,
maintain the standby mode when a time for which the mobile device continuously stays in the inactivation area is shorter than a predetermined stop margin time even in a case where the mobile device enters the inactivation area, and
set the operation mode to the stop mode when the time for which the mobile device continuously stays in the inactivation area is longer than or equal to the stop margin time.

10. A vehicle remote operation system configured to perform control to move a vehicle based on wireless communication with a mobile device carried by a user of the vehicle, the vehicle remote operation system comprising:

one or more processors; and
a memory coupled to the one or more processors and storing program instructions that when executed by the one or more processors cause the one or more processors to at least:

perform the wireless communication with the mobile device;

determine whether the mobile device exists in an activation area predetermined for the vehicle, based on a communication situation between the one or more processors and the mobile device;

accept a remote operation as a user instruction operation to move the vehicle via the mobile device based on determination that the mobile device exists in the activation area;

perform control corresponding to a content of the remote operation that is accepted;

notify the user that a position of the mobile device changes from an inside of the activation area to an outside of the activation area via the mobile device or an instrument mounted on the vehicle;

accept the remote operation while a predetermined acceptance continuation condition is satisfied even when the position of the mobile device changes from the inside of the activation area to the outside of the activation area;

determine whether the mobile device exists in a marginal area formed adjacently to the activation area in the outside of the activation area, based on the communication situation with the mobile device;

accept the remote operation on condition that the mobile device exists in the marginal area until a predetermined return limit time elapses after a time when the position of the mobile device changes from the activation area to the marginal area;

determine whether the mobile device exists in an inactivation area outside the marginal area corresponding to the vehicle, based on the communication situation with the mobile device; and not accept the remote operation when the position of the mobile device changes from the marginal area to the inactivation area or when a time for which the mobile device exists in the marginal area exceeds the return limit time.

11. A vehicle remote operation system configured to perform control to move a vehicle based on wireless communication with a mobile device carried by a user of the vehicle, the vehicle remote operation system comprising:

a communication device configured to perform the wireless communication with the mobile device;

a position determination portion configured to determine whether the mobile device exists in an activation area predetermined for the vehicle, based on a communication situation between the communication device and the mobile device;

a remote operation acceptance portion configured to accept a remote operation as a user instruction operation to move the vehicle via the mobile device based on a result that the position determination portion determines that the mobile device exists in the activation area;

a control execution portion configured to perform control corresponding to a content of the remote operation accepted by the remote operation acceptance portion;

a notification processor configured to notify the user that a position of the mobile device changes from an inside of the activation area to an outside of the activation area via the mobile device or an instrument mounted on the vehicle; and a near-field communication device that is the communication device and is configured to perform the wireless communication compliant with a communication standard specifying a communication distance of eight meters or longer, wherein:

the remote operation acceptance portion is configured to accept the remote operation while a predetermined acceptance continuation condition is satisfied even when the position of the mobile device changes from the inside of the activation area to the outside of the activation area;

the position determination portion is configured to determine whether the mobile device exists in a marginal area formed adjacently to the activation area in the outside of the activation area, based on the communication situation with the mobile device;

the remote operation acceptance portion is configured to accept the remote operation on condition that the mobile device exists in the marginal area until a predetermined return limit time elapses after a time when the position of the mobile device changes from the activation area to the marginal area; and the marginal area is set to an entire area that
- is in a range where the near-field communication device is configured to perform the wireless communication and
- is outside the activation area.

* * * * *